(12) United States Patent
Du et al.

(10) Patent No.: US 10,682,960 B2
(45) Date of Patent: Jun. 16, 2020

(54) VEHICLE, RUNNING BOARD ASSEMBLY AND DRIVE ASSEMBLY FOR RUNNING BOARD

(71) Applicant: T-MAX (HANGZHOU) TECHNOLOGY CO., LTD., Hangzhou (CN)

(72) Inventors: Xinfa Du, Hangzhou (CN); Qi Zhang, Hangzhou (CN); Songfeng Wang, Hangzhou (CN)

(73) Assignee: T-MAX (HANGZHOU) TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/510,775

(22) Filed: Jul. 12, 2019

(65) Prior Publication Data

US 2020/0023779 A1    Jan. 23, 2020

Related U.S. Application Data

(63) Continuation of application No. 16/199,517, filed on Nov. 26, 2018, now Pat. No. 10,384,614.

(30) Foreign Application Priority Data

Jul. 20, 2018  (CN) .......................... 2018 1 0805743
Jul. 20, 2018  (CN) ..................... 2018 2 1161957 U

(51) Int. Cl.
*B60R 3/02*  (2006.01)
*B60R 3/00*  (2006.01)
*B62D 21/02* (2006.01)

(52) U.S. Cl.
CPC ................ *B60R 3/02* (2013.01); *B60R 3/002* (2013.01); *B62D 21/02* (2013.01)

(58) Field of Classification Search
CPC .............. B60R 3/00; B60R 3/002; B60R 3/02
(Continued)

(56) References Cited

U.S. PATENT DOCUMENTS

| 7,591 A   | 8/1850  | Burdett       |
|-----------|---------|---------------|
| 634,385 A | 10/1899 | Wolfe et al.  |

(Continued)

FOREIGN PATENT DOCUMENTS

| CA | 1021826 | 11/1977 |
|----|---------|---------|
| CA | 2082177 | 5/1994  |

(Continued)

OTHER PUBLICATIONS

International Search Report and Written Opinion of the International Searching Authority for PCT International Application No. PCT/CN2015/097930 dated May 10, 2016.

(Continued)

*Primary Examiner* — Jeffrey J Restifo
(74) *Attorney, Agent, or Firm* — Perkins Coie LLP

(57) ABSTRACT

A vehicle, a running board assembly, and a drive assembly for a running board are disclosed. The drive assembly includes: a mounting base, a first connecting portion, a second connecting portion, and a running board holder. The first connecting portion is rotatably connected with the mounting base and the running board holder. The second connecting portion is rotatably connected with the mounting base and the running board holder. The running board holder includes a third main body and a third hinged portion. The first connecting portion includes a first main body and a plurality of first hinged portions, and the third hinged portion is rotatably connected among the plurality of first hinged portions; and/or the second connecting portion includes a second main body and a plurality of second hinged portions, (Continued)

the third hinged portion being rotatably connected among the plurality of second hinged portions.

19 Claims, 19 Drawing Sheets

(58) Field of Classification Search
USPC .................................................. 280/166, 163
See application file for complete search history.

(56) References Cited

U.S. PATENT DOCUMENTS

| | | |
|---|---|---|
| 724,155 A | 3/1903 | Besse |
| 752,031 A | 2/1904 | Chadwick |
| 817,224 A | 4/1906 | Clifford |
| 955,658 A | 4/1910 | Mitchell et al. |
| 1,063,643 A | 6/1913 | Blake et al. |
| 1,169,140 A | 1/1916 | Fassett et al. |
| 1,176,538 A | 3/1916 | Warner |
| 1,182,169 A | 5/1916 | Hansen |
| 1,222,127 A | 4/1917 | Perri |
| 1,239,892 A | 9/1917 | Dunderdale |
| 1,242,828 A | 10/1917 | Lyle |
| 1,250,604 A | 12/1917 | Lorenc |
| 1,268,335 A | 6/1918 | Fairchild |
| 1,364,697 A | 1/1921 | Branch |
| 1,437,648 A | 12/1922 | Gore |
| 1,449,031 A | 3/1923 | Blake |
| 1,471,972 A | 10/1923 | Miller |
| 1,621,479 A | 3/1927 | Cleveland et al. |
| 1,755,942 A | 4/1930 | Woolson |
| 1,800,162 A | 4/1931 | Stroud |
| 2,029,745 A | 2/1936 | Stiner |
| 2,041,640 A | 5/1936 | Goss |
| 2,118,557 A | 5/1938 | Hamilton |
| 2,122,040 A | 6/1938 | Machovec |
| 2,125,085 A | 7/1938 | Pool |
| 2,197,266 A | 4/1940 | Fredell |
| 2,209,576 A | 7/1940 | McDonald |
| 2,246,986 A | 6/1941 | Pellegrini |
| 2,436,961 A | 3/1948 | Gabriel |
| 2,487,921 A | 11/1949 | Culver |
| 2,492,068 A | 12/1949 | Schofield et al. |
| 2,566,401 A | 9/1951 | Bustin |
| 2,575,615 A | 11/1951 | Crump |
| 2,583,894 A | 1/1952 | Shuck |
| 2,645,504 A | 7/1953 | Branstrator et al. |
| 2,669,613 A | 2/1954 | Despard |
| 2,678,832 A | 5/1954 | Wright |
| 2,682,671 A | 7/1954 | Faure |
| 2,764,422 A | 9/1956 | McDonald |
| 2,774,494 A | 12/1956 | Malmström |
| 2,825,582 A | 3/1958 | McDonald |
| 2,921,643 A | 1/1960 | Vanderveld |
| 2,925,876 A | 2/1960 | Wagner |
| 2,998,265 A | 8/1961 | Kozicki |
| 3,008,533 A | 11/1961 | Haberle |
| 3,012,633 A | 12/1961 | Magee |
| 3,039,562 A | 6/1962 | Wagner |
| 3,095,216 A | 6/1963 | Browne et al. |
| 3,164,394 A | 1/1965 | Husko |
| 3,172,499 A | 3/1965 | Stairs |
| 3,266,594 A | 8/1966 | Antosh et al. |
| 3,329,443 A | 7/1967 | Lowder et al. |
| 3,392,990 A | 7/1968 | Wolf |
| 3,488,066 A | 1/1970 | Hansen |
| 3,494,634 A | 2/1970 | De Paula |
| 3,515,406 A | 6/1970 | Endsley |
| 3,517,942 A | 6/1970 | Cuffe et al. |
| 3,522,396 A | 7/1970 | Norden |
| 3,528,574 A | 9/1970 | Denner et al. |
| 3,572,754 A | 3/1971 | Fowler |
| 3,608,957 A | 9/1971 | Maneck |
| 3,650,423 A | 3/1972 | O'Brien |
| 3,671,058 A | 6/1972 | Kent |
| 3,745,595 A | 7/1973 | Nagy |
| 3,756,622 A | 9/1973 | Pyle et al. |
| 3,762,742 A | 10/1973 | Bucklen |
| 3,784,227 A | 1/1974 | Rogge |
| 3,799,288 A | 3/1974 | Manuel |
| 3,807,757 A | 4/1974 | Carpenter et al. |
| 3,833,240 A | 9/1974 | Weiler |
| 3,853,369 A | 12/1974 | Holden |
| 3,863,890 A | 2/1975 | Ruffing |
| 3,865,399 A | 2/1975 | Way |
| 3,869,022 A | 3/1975 | Wallk |
| 3,869,169 A | 3/1975 | Johnson et al. |
| 3,887,217 A | 6/1975 | Thomas |
| 3,889,997 A | 6/1975 | Schoneck |
| 3,891,261 A | 6/1975 | Finneman |
| 3,913,497 A | 10/1975 | Maroshick |
| 3,915,475 A | 10/1975 | Casella et al. |
| 3,957,284 A | 5/1976 | Wright |
| 3,961,809 A | 6/1976 | Clugston |
| 3,980,319 A | 9/1976 | Kirkpatrick |
| 3,981,515 A | 9/1976 | Rosborough |
| 3,986,724 A | 10/1976 | Rivinius |
| 3,997,211 A | 12/1976 | Graves |
| 4,020,920 A | 5/1977 | Abbott |
| 4,053,172 A | 10/1977 | McClure |
| 4,058,228 A | 11/1977 | Hall |
| 4,068,542 A | 1/1978 | Brand et al. |
| 4,073,502 A | 2/1978 | Frank et al. |
| 4,089,538 A | 5/1978 | Eastridge |
| 4,098,346 A | 7/1978 | Stanfill |
| 4,106,790 A | 8/1978 | Weiler |
| 4,110,673 A | 8/1978 | Nagy et al. |
| 4,116,457 A | 9/1978 | Nerem et al. |
| 4,124,099 A | 11/1978 | Dudynskyj |
| 4,145,066 A | 3/1979 | Shearin |
| 4,164,292 A | 8/1979 | Karkau |
| 4,168,764 A | 9/1979 | Walters |
| 4,174,021 A | 11/1979 | Barlock |
| 4,180,143 A | 12/1979 | Clugston |
| 4,185,849 A | 1/1980 | Jaeger |
| 4,188,889 A | 2/1980 | Favrel |
| 4,194,754 A | 3/1980 | Hightower |
| 4,205,862 A | 6/1980 | Tarvin |
| 4,219,104 A | 8/1980 | MacLeod |
| 4,231,583 A | 11/1980 | Learn |
| 4,275,664 A | 6/1981 | Reddy |
| 4,325,668 A | 4/1982 | Julian et al. |
| 4,369,984 A | 1/1983 | Hagen |
| 4,424,751 A | 1/1984 | Blochlinger |
| 4,440,364 A | 4/1984 | Cone et al. |
| 4,462,486 A | 7/1984 | Dignan |
| 4,536,004 A | 8/1985 | Brynielsson et al. |
| 4,542,805 A | 9/1985 | Hamlin et al. |
| 4,570,962 A | 2/1986 | Chavira |
| 4,623,160 A | 11/1986 | Trudell |
| D287,001 S | 12/1986 | Jarvie et al. |
| 4,676,013 A | 6/1987 | Endo |
| 4,679,810 A | 7/1987 | Kimball |
| 4,696,349 A | 9/1987 | Harwood et al. |
| D292,904 S | 11/1987 | Bielby |
| 4,708,355 A | 11/1987 | Tiede |
| 4,711,613 A | 12/1987 | Fretwell |
| 4,720,116 A | 1/1988 | Williams et al. |
| 4,733,752 A | 3/1988 | Sklar |
| 4,757,876 A | 7/1988 | Peacock |
| 4,846,487 A | 7/1989 | Criley |
| 4,858,888 A | 8/1989 | Cruz et al. |
| 4,909,700 A | 3/1990 | Fontecchio et al. |
| 4,911,264 A | 3/1990 | McCafferty |
| 4,926,965 A | 5/1990 | Fox |
| 4,930,973 A | 6/1990 | Robinson |
| 4,958,979 A | 9/1990 | Svensson |
| 4,982,974 A | 1/1991 | Guidry |
| 4,991,890 A | 2/1991 | Paulson |
| D316,394 S | 4/1991 | Carr |
| 5,005,667 A | 4/1991 | Anderson |
| 5,005,850 A | 4/1991 | Baughman |
| 5,007,654 A | 4/1991 | Sauber |
| 5,028,063 A | 7/1991 | Andrews |

(56) References Cited

U.S. PATENT DOCUMENTS

| | | |
|---|---|---|
| 5,039,119 A | 8/1991 | Baughman |
| 5,085,450 A | 2/1992 | DeHart, Sr. |
| 5,137,294 A | 8/1992 | Martin |
| 5,154,125 A | 10/1992 | Renner et al. |
| 5,195,609 A | 3/1993 | Ham et al. |
| 5,199,731 A | 4/1993 | Martin |
| 5,228,707 A | 7/1993 | Yoder |
| 5,228,761 A | 7/1993 | Huebschen et al. |
| 5,238,300 A | 8/1993 | Slivon et al. |
| 5,253,973 A | 10/1993 | Fretwell |
| D340,905 S | 11/1993 | Orth et al. |
| 5,257,767 A | 11/1993 | McConnell |
| 5,257,847 A | 11/1993 | Yonehara |
| 5,261,779 A | 11/1993 | Goodrich |
| 5,280,934 A | 1/1994 | Monte |
| 5,284,349 A | 2/1994 | Bruns et al. |
| 5,286,049 A | 2/1994 | Khan |
| 5,342,073 A | 8/1994 | Poole |
| 5,358,268 A | 10/1994 | Hawkins |
| 5,375,864 A | 12/1994 | McDaniel |
| 5,423,463 A | 6/1995 | Weeks |
| 5,425,615 A | 6/1995 | Hall et al. |
| 5,439,342 A | 8/1995 | Hall et al. |
| 5,462,302 A | 10/1995 | Leitner |
| 5,478,124 A | 12/1995 | Warrington |
| 5,498,012 A | 3/1996 | McDaniel et al. |
| 5,501,475 A | 3/1996 | Bundy |
| 5,505,476 A | 4/1996 | Maccabee |
| 5,513,866 A | 5/1996 | Sisson |
| 5,538,100 A | 7/1996 | Hedley |
| 5,538,265 A | 7/1996 | Chen et al. |
| 5,538,269 A | 7/1996 | McDaniel et al. |
| 5,547,040 A | 8/1996 | Hanser et al. |
| 5,549,312 A | 8/1996 | Garvert |
| 5,584,493 A | 12/1996 | Demski et al. |
| 5,601,300 A | 2/1997 | Fink et al. |
| 5,624,127 A | 4/1997 | Arreola et al. |
| 5,697,623 A | 12/1997 | Bermes et al. |
| 5,697,626 A | 12/1997 | McDaniel |
| 5,727,840 A | 3/1998 | Ochiai et al. |
| 5,779,208 A | 7/1998 | McGraw |
| 5,842,709 A | 12/1998 | Maccabee |
| 5,876,051 A | 3/1999 | Sage |
| 5,897,125 A | 4/1999 | Bundy |
| 5,937,468 A | 8/1999 | Wiedeck et al. |
| 5,941,342 A | 8/1999 | Lee |
| 5,957,237 A | 9/1999 | Tigner |
| 5,980,449 A | 11/1999 | Benson et al. |
| 5,988,970 A | 11/1999 | Holtom |
| 6,012,545 A | 1/2000 | Faleide |
| 6,027,090 A | 2/2000 | Liu |
| 6,042,052 A | 3/2000 | Smith et al. |
| 6,055,780 A | 5/2000 | Yamazaki |
| 6,065,924 A | 5/2000 | Budd |
| 6,082,693 A | 7/2000 | Benson et al. |
| 6,082,751 A | 7/2000 | Hanes et al. |
| 6,112,152 A | 8/2000 | Tuttle |
| 6,135,472 A | 10/2000 | Wilson et al. |
| 6,149,172 A | 11/2000 | Pascoe et al. |
| 6,158,756 A | 12/2000 | Hansen |
| 6,168,176 B1 | 1/2001 | Mueller |
| 6,170,842 B1 | 1/2001 | Mueller |
| 6,179,312 B1 | 1/2001 | Paschke et al. |
| 6,179,546 B1 | 1/2001 | Citrowske |
| 6,203,040 B1 | 3/2001 | Hutchins |
| 6,213,486 B1 | 4/2001 | Kunz et al. |
| 6,224,317 B1 | 5/2001 | Kann |
| 6,264,222 B1 | 7/2001 | Johnston et al. |
| 6,270,099 B1 | 8/2001 | Farkash |
| 6,325,397 B1 | 12/2001 | Pascoe |
| 6,352,295 B1 | 3/2002 | Leitner |
| 6,357,992 B1 | 3/2002 | Ringdahl et al. |
| 6,375,207 B1 * | 4/2002 | Dean .................. B60R 3/02 182/88 |
| 6,412,799 B1 | 7/2002 | Schrempf |
| 6,422,342 B1 | 7/2002 | Armstrong et al. |
| 6,425,572 B1 | 7/2002 | Lehr |
| 6,430,164 B1 | 8/2002 | Jones et al. |
| 6,435,534 B1 | 8/2002 | Stone |
| 6,439,342 B1 | 8/2002 | Boykin |
| 6,460,915 B1 | 10/2002 | Bedi et al. |
| 6,471,002 B1 | 10/2002 | Weinermen |
| 6,511,086 B2 | 1/2003 | Schlicht |
| 6,511,402 B2 | 1/2003 | Shu |
| 6,513,821 B1 | 2/2003 | Heil |
| 6,533,303 B1 | 3/2003 | Watson |
| 6,536,790 B1 | 3/2003 | Ojanen |
| 6,588,783 B2 | 7/2003 | Fichter |
| 6,612,596 B2 | 9/2003 | Jeon et al. |
| 6,641,158 B2 | 11/2003 | Leitner |
| 6,659,484 B2 | 12/2003 | Knodle et al. |
| 6,663,125 B1 | 12/2003 | Cheng |
| 6,746,033 B1 | 6/2004 | McDaniel |
| 6,769,704 B2 | 8/2004 | Cipolla |
| 6,810,995 B2 | 11/2004 | Warford |
| 6,812,466 B2 | 11/2004 | O'Connor et al. |
| 6,830,257 B2 | 12/2004 | Leitner |
| 6,834,875 B2 * | 12/2004 | Leitner .................. B60R 3/02 280/166 |
| 6,840,526 B2 | 1/2005 | Anderson et al. |
| 6,874,801 B2 | 4/2005 | Fichter |
| 6,880,843 B1 | 4/2005 | Greer, Jr. |
| 6,912,912 B2 | 7/2005 | Reichinger et al. |
| 6,918,624 B2 | 7/2005 | Miller et al. |
| 6,926,295 B2 | 8/2005 | Berkebile et al. |
| 6,938,909 B2 | 9/2005 | Leitner |
| 6,942,233 B2 | 9/2005 | Leitner et al. |
| 6,942,272 B2 | 9/2005 | Livingston |
| 6,948,903 B2 | 9/2005 | Ablabutyan et al. |
| 6,951,357 B2 | 10/2005 | Armstrong et al. |
| 6,955,370 B2 | 10/2005 | Fabiano et al. |
| 6,959,937 B2 | 11/2005 | Schneider et al. |
| 6,966,597 B2 | 11/2005 | Tegtmeier |
| 6,971,652 B2 | 12/2005 | Bobbert et al. |
| 6,997,469 B2 | 2/2006 | Lanoue et al. |
| 7,000,932 B2 | 2/2006 | Heil et al. |
| 7,007,961 B2 | 3/2006 | Leitner |
| 7,017,927 B2 | 3/2006 | Henderson et al. |
| 7,055,839 B2 | 6/2006 | Leitner |
| 7,090,276 B1 | 8/2006 | Bruford et al. |
| 7,111,859 B2 | 9/2006 | Kim et al. |
| 7,118,120 B2 * | 10/2006 | Lee .................. B60R 3/002 280/166 |
| 7,163,221 B2 | 1/2007 | Leitner |
| 7,258,386 B2 | 8/2007 | Leitner |
| 7,287,771 B2 * | 10/2007 | Lee .................. B60R 3/002 280/163 |
| 7,360,779 B2 | 4/2008 | Crandall |
| 7,367,574 B2 | 5/2008 | Leitner |
| 7,380,807 B2 | 6/2008 | Leitner |
| 7,398,985 B2 | 7/2008 | Leitner et al. |
| 7,413,204 B2 | 8/2008 | Leitner |
| 7,416,202 B2 | 8/2008 | Fichter |
| 7,487,986 B2 * | 2/2009 | Leitner .................. B60R 3/02 280/163 |
| 7,516,703 B2 | 4/2009 | Tazreiter |
| 7,566,064 B2 | 7/2009 | Leitner et al. |
| 7,584,975 B2 * | 9/2009 | Leitner .................. B60R 3/02 280/163 |
| 7,594,672 B2 * | 9/2009 | Piotrowski .............. B60R 3/002 280/163 |
| 7,621,546 B2 * | 11/2009 | Ross .................. B60R 3/02 280/163 |
| 7,637,519 B2 | 12/2009 | Leitner |
| 7,673,892 B2 * | 3/2010 | Kuntze .................. B60R 3/002 280/163 |
| 7,717,444 B2 | 5/2010 | Fichter |
| 7,740,261 B2 * | 6/2010 | Leitner .................. B60R 3/02 280/163 |
| 7,793,596 B2 | 9/2010 | Hirtenlehner |
| 7,823,896 B2 | 11/2010 | VanBelle |
| 7,874,565 B2 | 1/2011 | Duncan |
| D634,687 S | 3/2011 | Vukel |

(56) References Cited

U.S. PATENT DOCUMENTS

| | | |
|---|---|---|
| 7,900,944 B2 | 3/2011 | Watson |
| 7,909,344 B1 | 3/2011 | Bundy |
| 7,934,737 B2 | 5/2011 | Okada |
| 7,976,042 B2 | 7/2011 | Watson et al. |
| 8,038,164 B2 | 10/2011 | Stahl et al. |
| 8,042,821 B2 | 10/2011 | Yang |
| D649,100 S | 11/2011 | Cheng |
| 8,052,162 B2* | 11/2011 | Yang .................. B60R 3/02 |
| | | 280/163 |
| 8,056,913 B2 | 11/2011 | Kuntze et al. |
| 8,070,173 B2* | 12/2011 | Watson ............... B60R 3/02 |
| | | 280/163 |
| 8,136,826 B2 | 3/2012 | Watson |
| 8,146,935 B1 | 4/2012 | Adams |
| 8,157,277 B2 | 4/2012 | Leitner et al. |
| 8,177,247 B1 | 5/2012 | Carr |
| 8,205,901 B2 | 6/2012 | Yang et al. |
| D665,713 S | 8/2012 | Pochurek et al. |
| 8,262,113 B1 | 9/2012 | Chafey et al. |
| 8,297,635 B2 | 10/2012 | Agoncillo et al. |
| D671,874 S | 12/2012 | Kekich et al. |
| 8,342,550 B2 | 1/2013 | Stickles et al. |
| 8,342,551 B2 | 1/2013 | Watson et al. |
| 8,360,455 B2 | 1/2013 | Leitner et al. |
| 8,408,571 B2 | 4/2013 | Leitner et al. |
| 8,419,034 B2 | 4/2013 | Leitner et al. |
| 8,469,380 B2* | 6/2013 | Yang .................. B60R 3/02 |
| | | 182/127 |
| 8,602,431 B1 | 12/2013 | May |
| 8,827,294 B1* | 9/2014 | Leitner ............... B60R 3/02 |
| | | 280/166 |
| 8,833,782 B2* | 9/2014 | Huotari .............. B60R 3/02 |
| | | 280/166 |
| 8,844,957 B2 | 9/2014 | Leitner et al. |
| D720,674 S | 1/2015 | Stanesic et al. |
| 8,936,266 B2 | 1/2015 | Leitner et al. |
| 8,944,451 B2 | 2/2015 | Leitner et al. |
| 9,156,406 B2 | 10/2015 | Stanesic et al. |
| 9,272,667 B2 | 3/2016 | Smith |
| 9,302,626 B2 | 4/2016 | Leitner et al. |
| 9,346,404 B1 | 5/2016 | Bundy |
| 9,346,405 B2 | 5/2016 | Leitner et al. |
| 9,511,717 B2 | 12/2016 | Smith |
| 9,522,634 B1 | 12/2016 | Smith |
| 9,527,449 B2 | 12/2016 | Smith |
| 9,550,458 B2* | 1/2017 | Smith ................. B60R 3/02 |
| 9,561,751 B2 | 2/2017 | Leitner et al. |
| 9,573,467 B2* | 2/2017 | Chen ................. B60K 26/02 |
| 9,656,609 B2 | 5/2017 | Du et al. |
| 9,669,766 B2 | 6/2017 | Du et al. |
| 9,669,767 B2* | 6/2017 | Du .................... B60R 3/02 |
| 9,688,205 B2* | 6/2017 | Du .................... B60R 3/02 |
| 9,701,249 B2 | 7/2017 | Leitner et al. |
| 9,764,691 B2* | 9/2017 | Stickles .............. B60R 3/02 |
| 9,809,172 B2 | 11/2017 | Stanesic et al. |
| 9,834,147 B2 | 12/2017 | Smith |
| 9,902,328 B1 | 2/2018 | Mazur |
| 9,944,231 B2* | 4/2018 | Leitner .............. B60R 3/02 |
| 10,053,017 B2 | 8/2018 | Leitner et al. |
| 10,065,486 B2 | 9/2018 | Smith et al. |
| 10,077,016 B2 | 9/2018 | Smith et al. |
| 10,081,302 B1 | 9/2018 | Frederick et al. |
| 10,106,069 B2 | 10/2018 | Rasekhi |
| 10,106,086 B1 | 10/2018 | Eckstein et al. |
| 10,106,087 B2 | 10/2018 | Stojkovic et al. |
| 10,106,088 B2 | 10/2018 | Smith |
| 10,118,557 B2 | 11/2018 | Pribisic |
| 10,124,735 B2* | 11/2018 | Du .................... B60R 3/02 |
| 10,124,839 B2 | 11/2018 | Povinelli et al. |
| 10,144,345 B2 | 12/2018 | Stinson et al. |
| 10,150,419 B2* | 12/2018 | Derbis ............... B60R 3/02 |
| 10,155,474 B2 | 12/2018 | Salter et al. |
| 10,173,595 B1 | 1/2019 | Ulrich |
| 10,183,623 B2 | 1/2019 | Kirshnan et al. |
| 10,183,624 B2 | 1/2019 | Leitner et al. |
| 10,189,517 B2 | 1/2019 | Povinelli et al. |
| 10,195,997 B2 | 2/2019 | Smith |
| 10,207,598 B2 | 2/2019 | Reynolds et al. |
| 10,214,963 B2 | 2/2019 | Simula et al. |
| 10,384,614 B1* | 8/2019 | Du ..................... B60R 3/002 |
| 2003/0011164 A1 | 1/2003 | Cipolla |
| 2003/0038446 A1 | 2/2003 | Anderson et al. |
| 2003/0090081 A1 | 5/2003 | Oakley |
| 2003/0094781 A1 | 5/2003 | Jaramillo et al. |
| 2003/0132595 A1 | 7/2003 | Fabiano |
| 2003/0200700 A1 | 10/2003 | Leitner |
| 2004/0100063 A1 | 5/2004 | Henderson et al. |
| 2004/0108678 A1 | 6/2004 | Berkebile et al. |
| 2004/0135339 A1 | 7/2004 | Kim |
| 2005/0035568 A1 | 2/2005 | Lee et al. |
| 2005/0146157 A1 | 7/2005 | Leitner |
| 2005/0280242 A1 | 12/2005 | Fabiano et al. |
| 2006/0214386 A1 | 9/2006 | Watson |
| 2006/0219484 A1 | 10/2006 | Ogura |
| 2006/0284440 A1 | 12/2006 | Leitner |
| 2008/0042396 A1 | 2/2008 | Watson |
| 2008/0100023 A1 | 5/2008 | Ross |
| 2008/0116653 A1* | 5/2008 | Piotrowski ........... B60R 3/002 |
| | | 280/166 |
| 2008/0271936 A1* | 11/2008 | Kuntze ............... B60R 3/002 |
| | | 180/90.6 |
| 2009/0250896 A1 | 10/2009 | Watson |
| 2009/0295114 A1 | 12/2009 | Yang et al. |
| 2010/0044993 A1 | 2/2010 | Watson |
| 2011/0115187 A1 | 5/2011 | Leitner et al. |
| 2012/0025485 A1 | 2/2012 | Yang et al. |
| 2013/0154230 A1 | 6/2013 | Ziaylek |
| 2015/0097353 A1 | 4/2015 | Rasmussen et al. |
| 2015/0197199 A1 | 7/2015 | Kuo |
| 2015/0321612 A1 | 11/2015 | Leitner et al. |
| 2015/0321613 A1 | 11/2015 | Leitner et al. |
| 2016/0039346 A1* | 2/2016 | Yang ................. B61D 23/02 |
| | | 280/166 |
| 2016/0193964 A1 | 7/2016 | Stanesic et al. |
| 2017/0008459 A1 | 1/2017 | Leitner et al. |
| 2017/0036607 A1 | 2/2017 | Du et al. |
| 2017/0144606 A1 | 5/2017 | Smith |
| 2017/0190308 A1 | 6/2017 | Smith |
| 2017/0246993 A1 | 8/2017 | Smith |
| 2017/0267182 A1 | 9/2017 | Leitner |
| 2017/0355315 A1 | 12/2017 | Leitner |
| 2018/0141497 A1 | 5/2018 | Smith |
| 2018/0201194 A1 | 7/2018 | Stanesic |
| 2018/0257572 A1 | 9/2018 | Du et al. |
| 2018/0281687 A1 | 10/2018 | Derbis et al. |
| 2018/0326911 A1 | 11/2018 | Leitner |
| 2019/0009725 A1 | 1/2019 | Stojkovic et al. |
| 2019/0047477 A1 | 2/2019 | Crandall |
| 2019/0054961 A1 | 2/2019 | Ngo |
| 2019/0071021 A1 | 3/2019 | Pribisic |
| 2019/0071042 A1 | 3/2019 | Smith |
| 2019/0084482 A1 | 3/2019 | Long et al. |
| 2019/0084628 A1 | 3/2019 | Povinelli et al. |

FOREIGN PATENT DOCUMENTS

| | | |
|---|---|---|
| CA | 2218280 A1 | 6/1999 |
| CA | 2332193 A1 | 9/2001 |
| CA | 2370618 A1 | 11/2007 |
| CN | 2174368 Y | 8/1994 |
| CN | 2806241 Y | 8/2006 |
| CN | 101279594 A | 10/2008 |
| CN | 202806579 U | 3/2013 |
| CN | 104192070 A | 12/2014 |
| CN | 105083137 A | 11/2015 |
| CN | 105128751 A | 12/2015 |
| CN | 108791086 A | 11/2018 |
| CN | 208232903 U | 12/2018 |
| CN | 208325054 U | 1/2019 |
| CN | 208344082 U | 1/2019 |
| DE | 1042403 B | 10/1958 |
| DE | 1220276 B | 6/1966 |
| DE | 2555468 A1 | 6/1977 |

(56) References Cited

FOREIGN PATENT DOCUMENTS

| | | |
|---|---|---|
| DE | 7922488 U1 | 7/1982 |
| DE | 3151621 A1 | 7/1983 |
| DE | 3932142 | 4/1990 |
| DE | 8910933 U1 | 10/1990 |
| EP | 0066493 | 12/1982 |
| EP | 373842 A1 | 6/1990 |
| EP | 0418615 A1 | 3/1991 |
| EP | 0559624 B1 | 8/1995 |
| EP | 0966367 A1 | 9/1998 |
| EP | 0901783 A2 | 3/1999 |
| EP | 1116840 A2 | 7/2001 |
| EP | 1213185 B1 | 12/2004 |
| EP | 3002157 | 4/2016 |
| EP | 3176038 B1 | 1/2019 |
| EP | 3237254 B1 | 2/2019 |
| FR | 1271901 A | 9/1961 |
| FR | 1350593 A | 12/1963 |
| FR | 2225612 A | 8/1974 |
| FR | 2651739 A1 | 3/1991 |
| FR | 2764254 A1 | 12/1998 |
| GB | 191315077 | 8/1913 |
| GB | 254426 | 7/1926 |
| GB | 340162 A | 12/1930 |
| GB | 381672 | 10/1932 |
| GB | 745918 | 3/1956 |
| GB | 934387 | 8/1963 |
| GB | 936846 | 9/1963 |
| GB | 987846 A | 3/1965 |
| GB | 1430813 A | 4/1976 |
| GB | 1471256 A | 4/1977 |
| GB | 2045699 A | 11/1980 |
| GB | 2055705 A | 3/1981 |
| GB | 2129378 | 5/1984 |
| GB | 2201511 A | 9/1988 |
| GB | 2288014 A | 10/1995 |
| IN | 201741011829 | 10/2018 |
| JP | 63-255144 A | 10/1988 |
| JP | H04138944 A | 5/1992 |
| JP | H04339040 A | 11/1992 |
| JP | H04342629 A | 11/1992 |
| JP | H05310061 A | 11/1993 |
| JP | H05310081 A | 11/1993 |
| JP | H08132967 A | 5/1996 |
| JP | H10287182 A | 10/1998 |
| JP | 2018-177089 A | 11/2018 |
| JP | 2019-001222 A | 1/2019 |
| KR | 2000-0003099 | 1/2000 |
| MX | 2017001699 A | 8/2018 |
| MX | 2017001700 A | 8/2018 |
| MX | 2017006328 A | 8/2018 |
| MX | 2017008032 A | 9/2018 |
| MX | 2017010183 A | 9/2018 |
| SU | 403594 | 11/1973 |
| SU | 783097 A1 | 11/1980 |
| WO | 1988/05759 A1 | 8/1988 |
| WO | 1995/00359 A1 | 1/1995 |
| WO | 1997/027139 A1 | 7/1997 |
| WO | 1998/43856 A2 | 10/1998 |
| WO | 2000/047449 A1 | 8/2000 |
| WO | 2001/000441 A1 | 1/2001 |
| WO | 2003/039910 A1 | 5/2003 |
| WO | 2003/039920 A1 | 5/2003 |
| WO | 2003/066380 A1 | 8/2003 |
| WO | 2003/069294 A1 | 8/2003 |
| WO | 2006/050297 A2 | 5/2006 |
| WO | 2009/103163 A1 | 8/2009 |
| WO | 2017/176226 A1 | 10/2017 |
| WO | 2018/148643 A1 | 8/2018 |
| WO | 2018/197393 A1 | 11/2018 |
| WO | 2019/009131 A1 | 1/2019 |
| WO | 2019/034493 A1 | 2/2019 |

OTHER PUBLICATIONS

U.S. Office Action dated Dec. 20, 2019 for U.S. Appl. No. 16/655,149, filed Oct. 16, 2019. (11 pages).

\* cited by examiner

VEHICLE, RUNNING BOARD ASSEMBLY AND DRIVE ASSEMBLY FOR RUNNING BOARD

CROSS-REFERENCE TO RELATED APPLICATIONS

This patent application is a continuation of and claims priority to U.S. application Ser. No. 16/199,517 filed Nov. 26, 2018, which claims priority to and benefits of Chinese Patent Application Serial No. 201810805743.4, filed with the State Intellectual Property Office of P.R. China on Jul. 20, 2018, and Chinese Patent Application Serial No. 201821161957.4, filed with the State Intellectual Property Office of P.R. China on Jul. 20, 2018. The entire content of the aforementioned patent documents are incorporated herein by reference for all purposes.

FIELD

The present disclosure relates to a technical field of vehicles, and more particularly to a drive assembly for a running board and a running board assembly for a vehicle, as well as a vehicle.

BACKGROUND

A drive assembly for a running board of a vehicle in the related art has a complicated structure and high manufacturing process requirements, so the cost is high. Moreover, during the long-term use of the drive assembly, due to harsh conditions like bumpy roads, mud or sand can be easily mixed into the drive assembly. If mud or sand enters the drive assembly, not only abnormal noise is caused, but also the drive assembly is worn, affecting the service life of the drive assembly. In addition, there is no cushioning member in the drive assembly, such that collisions easily occur among various components of the drive assembly, and the drive assembly cannot have sufficiently stable operation, which degrades the product performance.

SUMMARY

The present disclosure aims to solve at least one of the technical problems in the related art to a certain extent. Accordingly, one objective of the present disclosure is to propose a drive assembly for a running board and a running board assembly for a vehicle, as well as a vehicle.

A drive assembly for a running board according to embodiments of a first aspect of the present disclosure has a simple structure, high structural strength, and low cost.

A running board assembly for a vehicle according to embodiments of a second aspect of the present disclosure includes the above-described drive assembly.

A vehicle according to embodiments of a third aspect of the present disclosure includes the above-described running board assembly.

The drive assembly according to embodiments of the first aspect of the present disclosure includes: a mounting base; a running board holder; a first connecting portion rotatably connected with the mounting base and the running board holder; and a second connecting portion rotatably connected with the mounting base and the running board holder. A central rotation shaft of the second connection portion relative to the running board holder, a central rotation shaft of the second connection portion relative to the mounting base, a central rotation shaft of the first connection portion relative to the running board holder, and a central rotation shaft of the first connection portion relative to the mounting base each extend along a left-right direction and are parallel to one another; the mounting base, the first connecting portion, the second connecting portion and the running board holder constitute a linkage to make the running board holder movable between an extended position and a retracted position. The running board holder includes a third main body and a third hinged portion connected with the third main body; the first connecting portion includes a first main body, and a plurality of first hinged portions connected with the first main body and spaced apart in the left-right direction, the third hinged portion being rotatably connected among the plurality of first hinged portions; and/or the second connecting portion includes a second main body, and a plurality of second hinged portions connected with the second main body and spaced apart in the left-right direction, the third hinged portion being rotatably connected among the plurality of second hinged portions.

In the drive assembly according to embodiments of the present disclosure, the third hinged portion is rotatably provided between the first hinged portions and/or the second hinged portions, and the running board holder has a simple structure, good manufacturability, and hence low cost.

In addition, the drive assembly according to the above embodiments of the present disclosure may further have the following additional technical features.

According to an embodiment of the present disclosure, the first main body has a first end rotatably connected with the mounting base, and a second end provided with two first hinged portions spaced apart in the left-right direction; the two first hinged portions are disposed at both sides of the third hinged portion, and the third hinged portion is connected with the two first hinged portions through a first connecting shaft.

According to an embodiment of the present disclosure, the second main body has a first end rotatably connected with the mounting base, and a second end provided with two second hinged portions spaced apart in the left-right direction; the two second hinged portions are disposed at both sides of the third hinged portion, and the third hinged portion is connected with the two second hinged portions through a second connecting shaft.

According to an embodiment of the present disclosure, at least one of the first connecting portion and the running board holder is provided with a damping block, and the damping block abuts between the first connecting portion and the running board holder when the running board holder is in at least one of the extended position and the retracted position.

According to an embodiment of the present disclosure, at least one of the second connecting portion and the running board holder is provided with a damping block, and the damping block abuts between the second connecting portion and the running board holder when the running board holder is in at least one of the extended position and the retracted position.

According to an embodiment of the present disclosure, at least a part of the plurality of first hinged portions is provided with a damping block, the third main body is provided with a wedged bevel opposite the first hinged portion, and when the running board holder is in the extended position, the damping block abuts against the wedged bevel.

According to an embodiment of the present disclosure, two first hinged portions are provided and spaced apart in the left-right direction, and each of the two first hinged portions is provided with the damping block; the third main body is provided with the wedged bevel at each of left and right sides of the third hinged portion, and the two wedged bevels are provided in one-to-one correspondence with the two first hinged portions; and when the running board holder is in the extended position, the damping blocks on the two first hinged portions abut against the corresponding wedged bevels.

According to an embodiment of the present disclosure, the first connecting portion is configured as a first link rod with two ends connected with the mounting base and the running board holder respectively; the second connecting portion is configured as a second link rod with two ends connected with the mounting base and the running board holder respectively.

According to an embodiment of the present disclosure, the first connecting portion includes: a third link rod rotatably connected with the mounting base; a fourth link rod having two ends rotatably connected with the third link rod and the running board holder respectively; and a support portion connected at a hinge joint of the third link rod and the fourth link rod, and connected with the second connecting portion.

According to an embodiment of the present disclosure, the support portion is a sliding block, the second connecting portion is provided with a sliding groove, and the support portion is slidably embedded in the sliding groove along a direction perpendicular to the left-right direction.

According to an embodiment of the present disclosure, the support portion is a fifth link rod, and the fifth link rod has a first end rotatably connected at the hinge joint of the third link rod and the fourth link rod and a second end rotatably connected with the second connecting portion.

According to an embodiment of the present disclosure, the third link rod includes two fourth hinged portions spaced apart in the left-right direction; the fourth link rod includes a fifth hinged portion; the two fourth hinged portions are disposed at left and right sides of the fifth hinged portion; and the fifth hinged portion and the two fourth hinged portions are connected by a third connecting shaft.

According to an embodiment of the present disclosure, two ends of the third connecting shaft protrude from the two fourth hinged portions to form or connect the support portion.

The running board assembly according to embodiments of the second aspect of the present disclosure includes: a running board; a drive assembly, the drive assembly being configured as the above-described drive assembly, the running board holder being connected with the running board; and a driving part connected with the first connecting portion to drive the first connecting portion to rotate with respect to the mounting base.

The running board assembly according to embodiments of the present disclosure includes the above-described drive assembly, and the driving part is used to drive the running board to extend or retract. The running board assembly has a simple structure, long service life, and low cost.

According to an embodiment of the present disclosure, the running board extends along a left-right direction, and is provided with a plurality of the drive assemblies spaced apart along the left-right direction.

According to an embodiment of the present disclosure, each of the drive assemblies is individually driven by one driving part.

The vehicle according to embodiments of the third aspect of the present disclosure includes the above-described running board assembly, and the cost of the vehicle is low.

Figure 1:
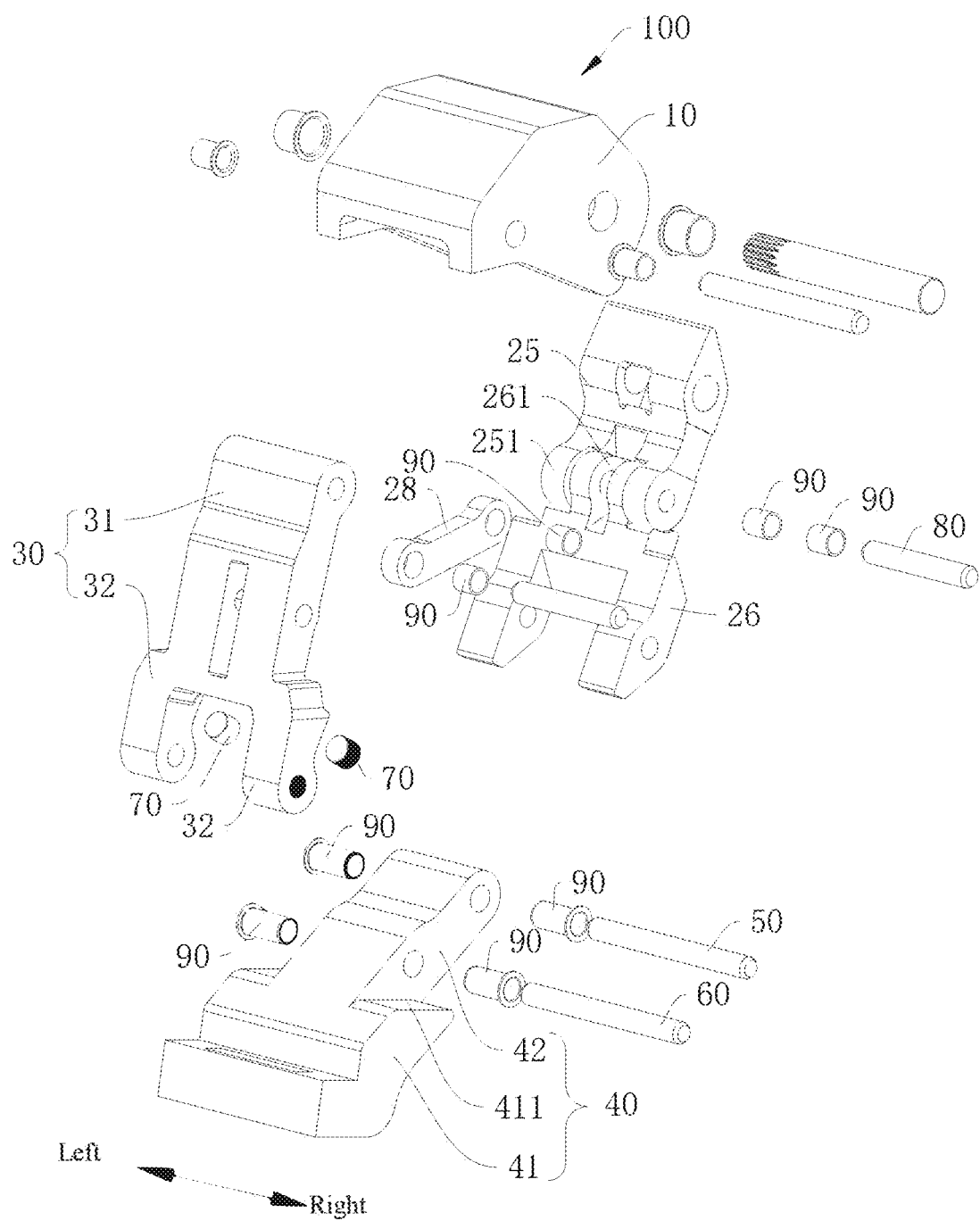
FIG. 1 is an exploded view of a drive assembly according to an embodiment of the present disclosure.
Figure 2:
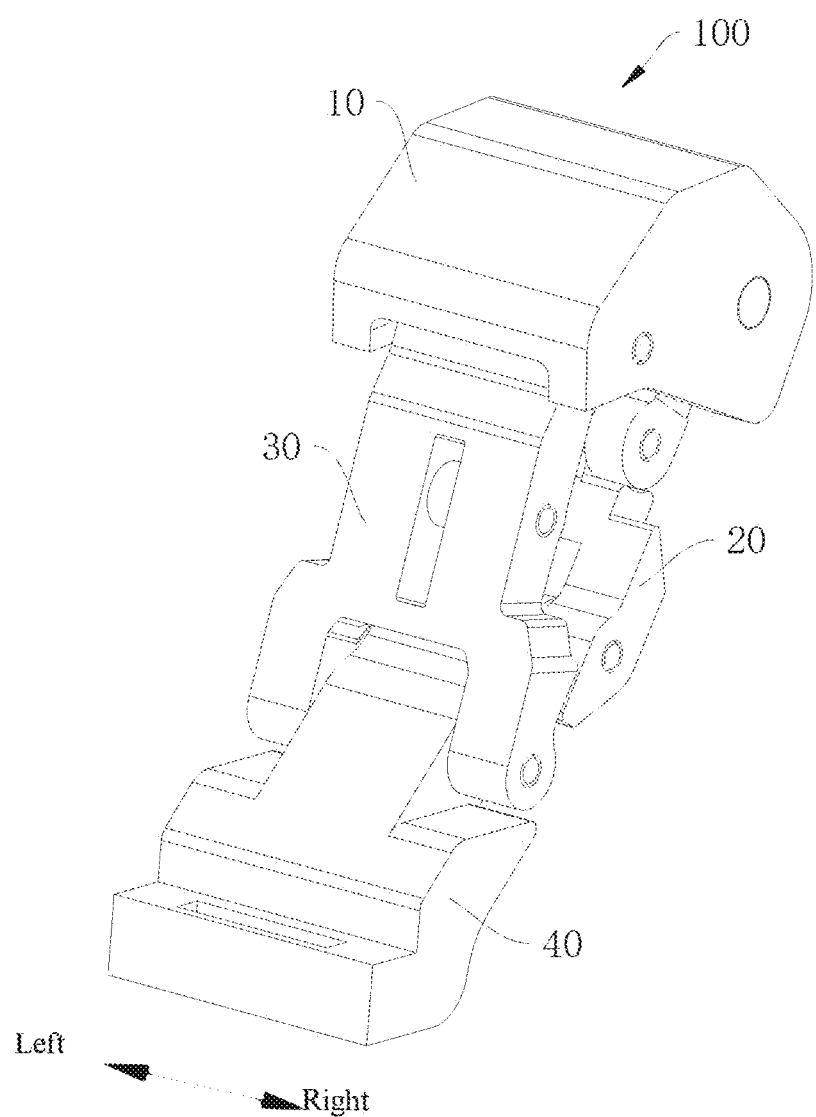
FIG. 2 is a schematic view of a drive assembly with a running board holder in an extended position according to an embodiment of the present disclosure.
Figure 3:
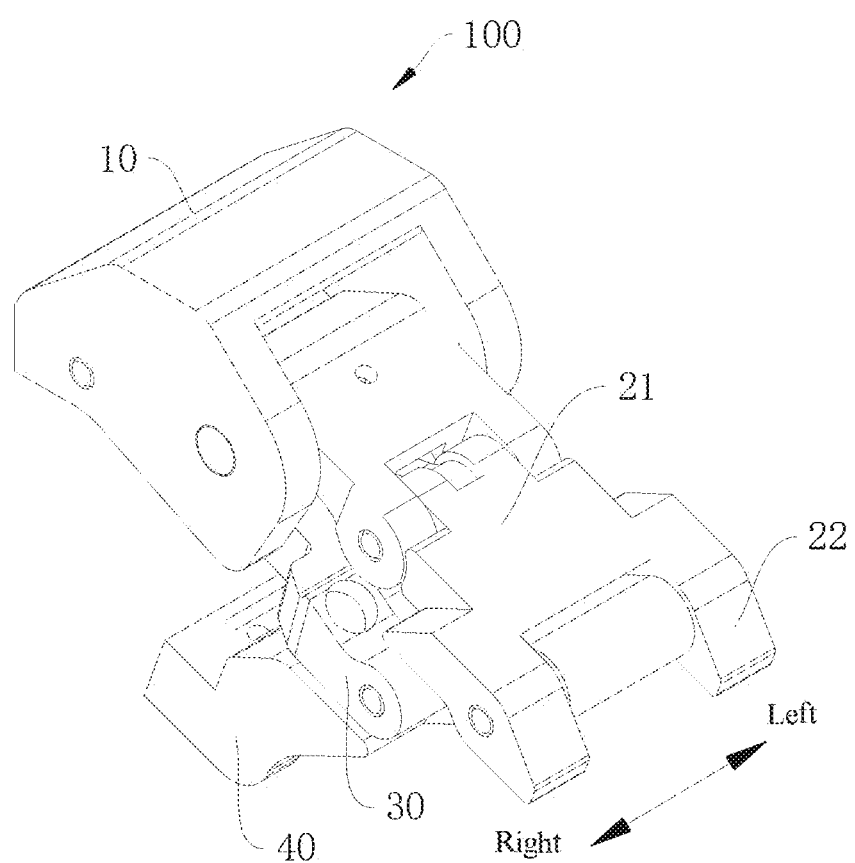
FIG. 3 is a schematic view of a drive assembly with a running board holder in a retracted position according to an embodiment of the present disclosure.
Figure 4:
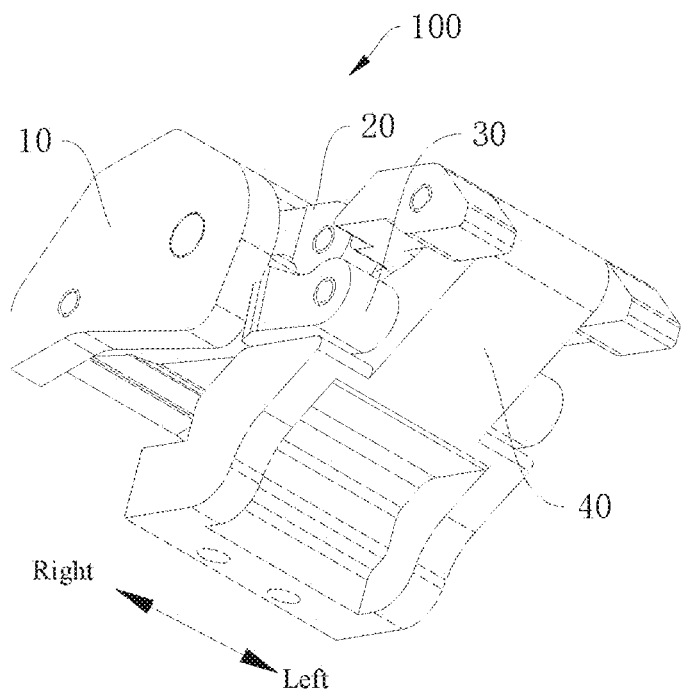
FIG. 4 is a schematic view of a drive assembly with a running board holder in a retracted position according to an embodiment of the present disclosure.
Figure 5:
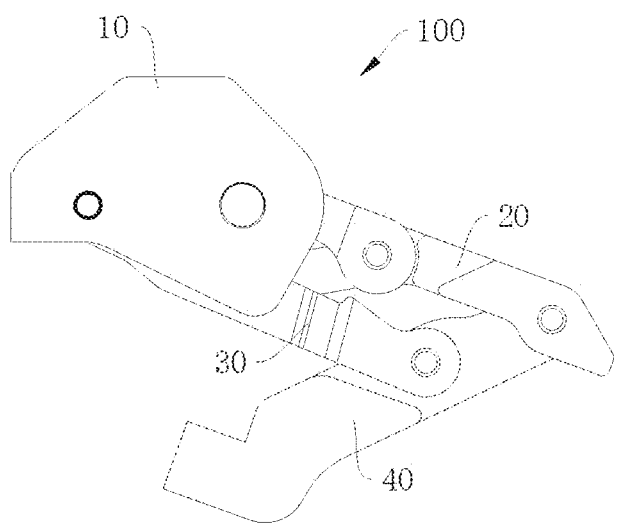
FIG. 5 is a side view of a drive assembly with a running board holder in a retracted position according to an embodiment of the present disclosure.
Figure 6:
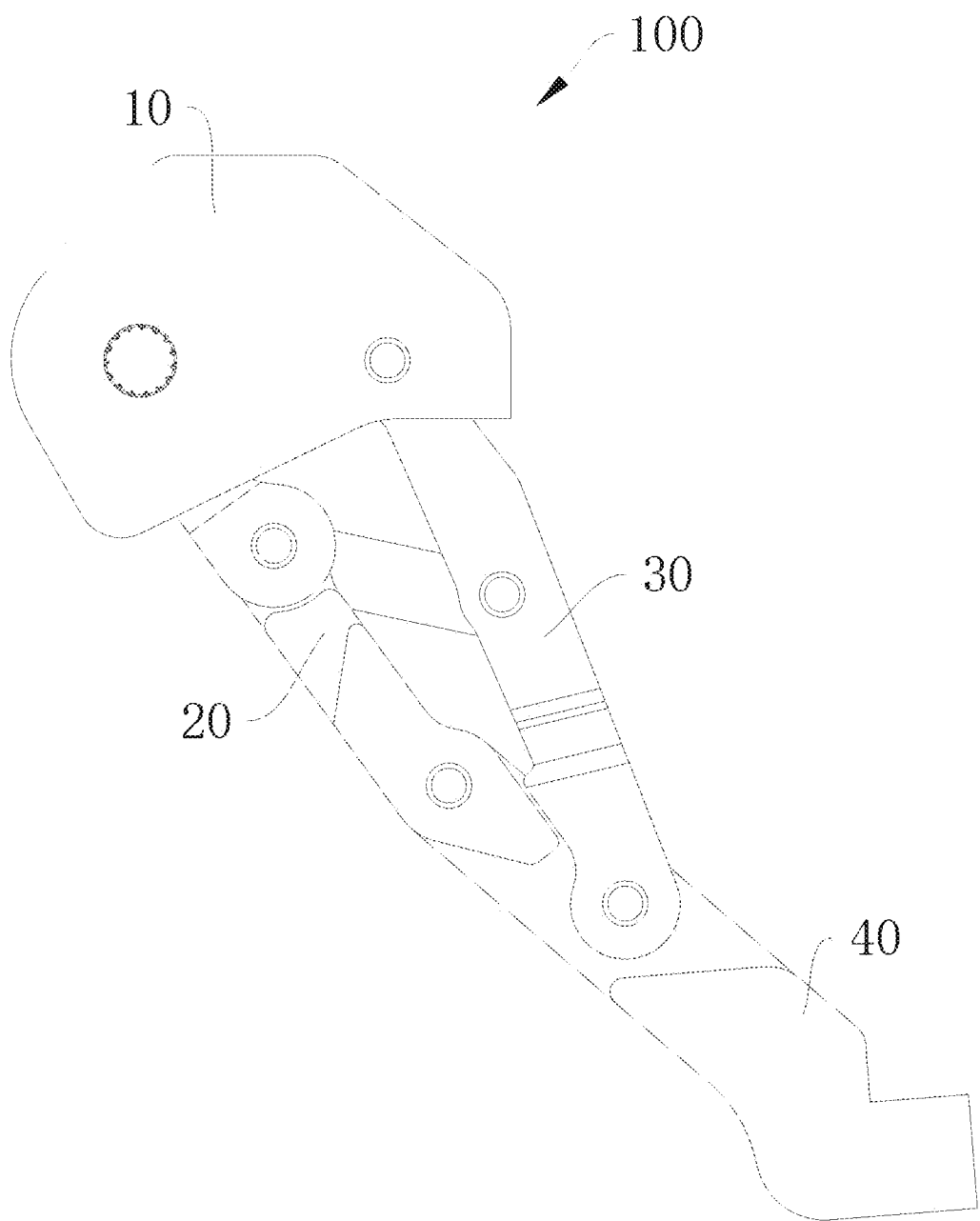
FIG. 6 is a side view of a drive assembly with a running board holder in an extended position according to an embodiment of the present disclosure.

REFERENCE NUMERALS running board assembly 1,
drive assembly 100,
mounting base 10,
first connecting portion 20, first main body 21, first hinged portion 22, first link rod 23, third link rod 25, fourth hinged portion 251, fourth link rod 26, fifth hinged portion 261, sliding block 27, fifth link rod 28,
second connecting portion 30, second main body 31, second hinged portion 32, sliding groove 33, second link rod 34,
running board holder 40, third main body 41, wedged bevel 411, third hinged portion 42,
first connecting shaft 50, second connecting shaft 60, damping block 70, third connecting shaft 80, sleeve 90, running board 200.

DETAILED DESCRIPTION

Embodiments of the present disclosure will be described in detail and examples of the embodiments will be illustrated in the drawings, where same or similar reference numerals are used to indicate same or similar elements or elements with same or similar functions. The embodiments described herein with reference to the drawings are explanatory, illustrative, and used to generally understand the present disclosure. The embodiments shall not be construed to limit the present disclosure.

A vehicle and a running board assembly, as well as a drive assembly 100 for a running board 200 according to embodiments of the present disclosure will be described below with reference to FIGS. 1-23.

Figure 7:
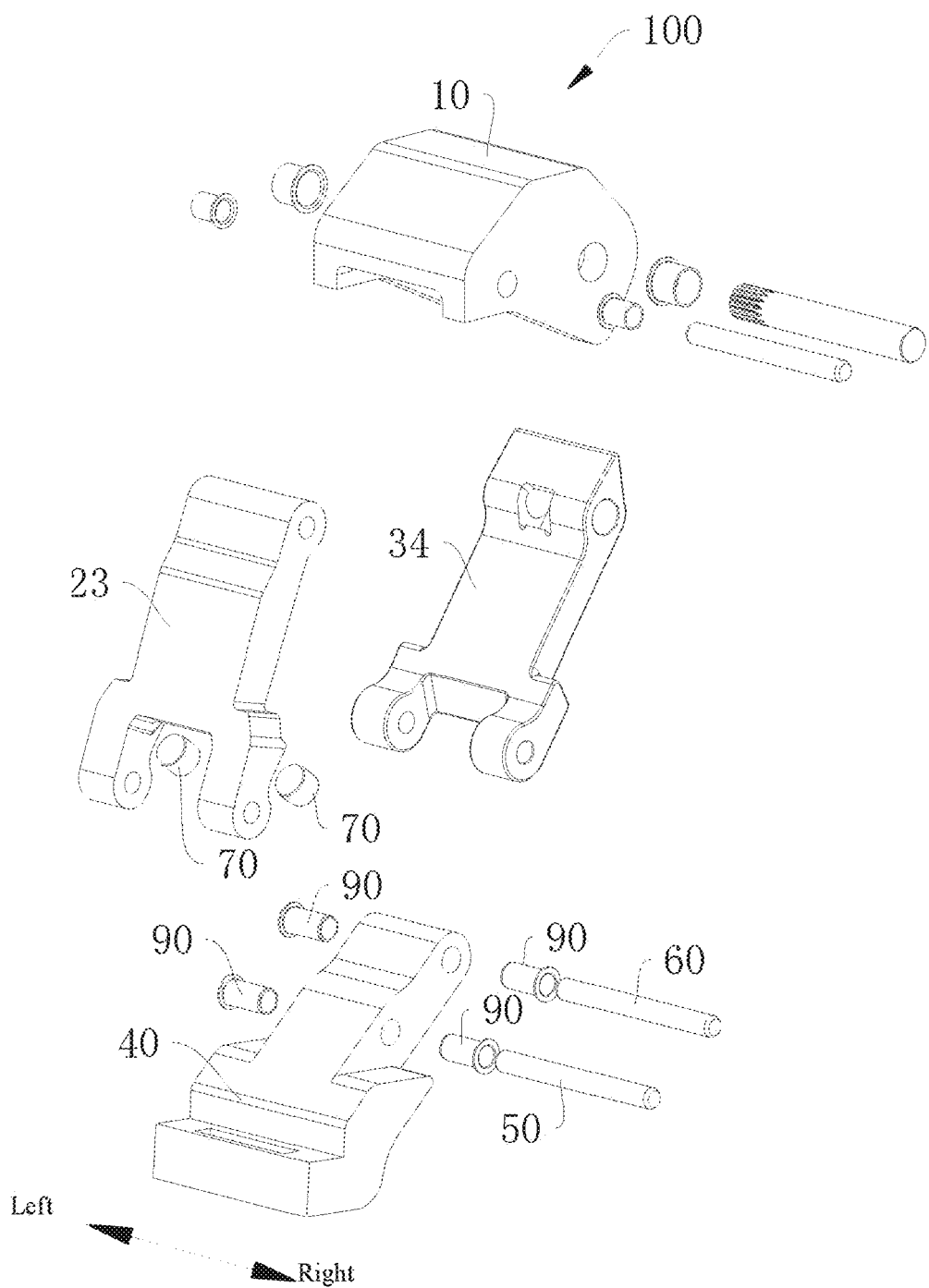
FIG. 7 is an exploded view of a drive assembly according to an embodiment of the present disclosure.
Figure 8:
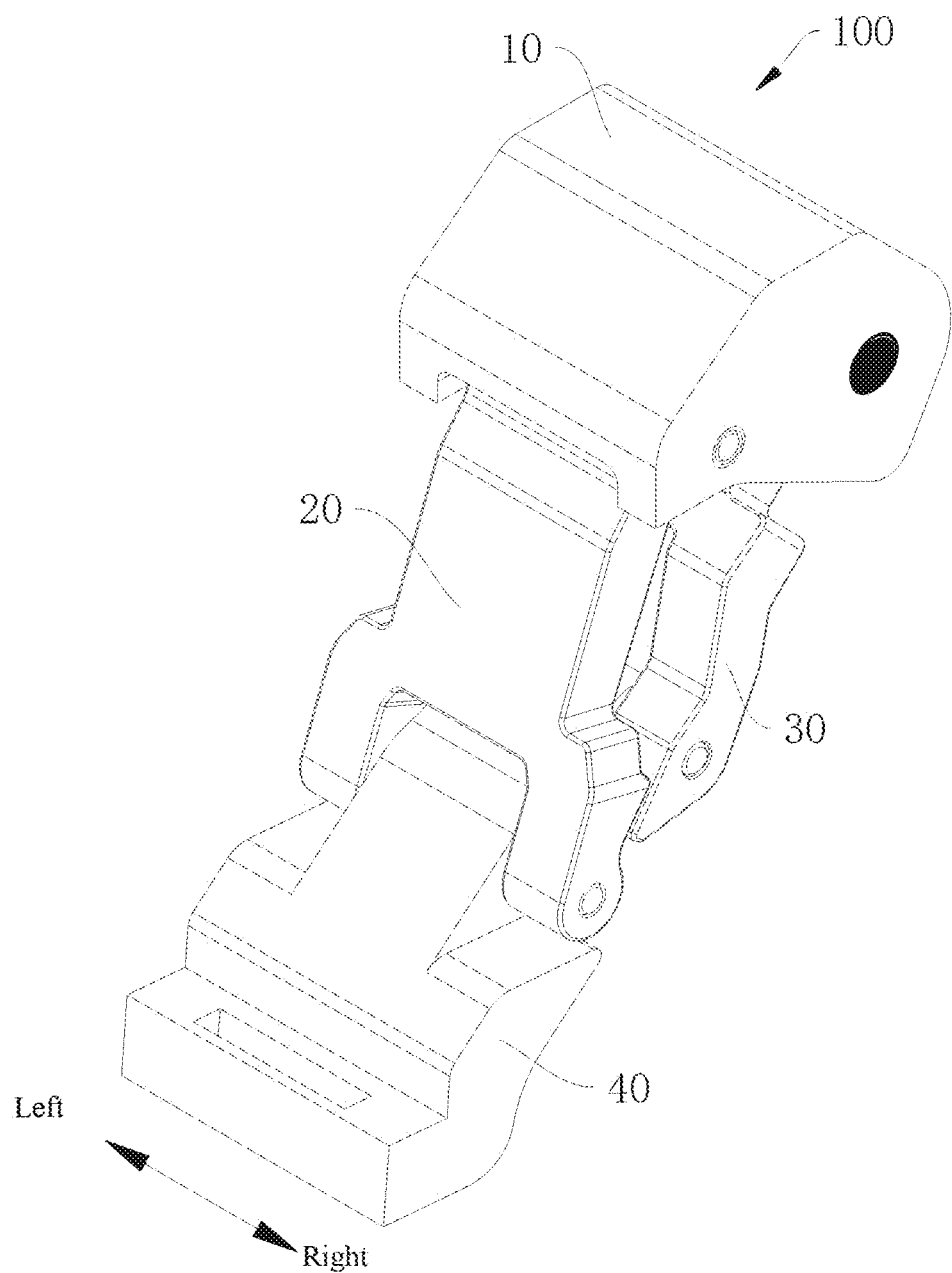
FIG. 8 is a schematic view of a drive assembly with a running board holder in an extended position according to an embodiment of the present disclosure.
Figure 9:
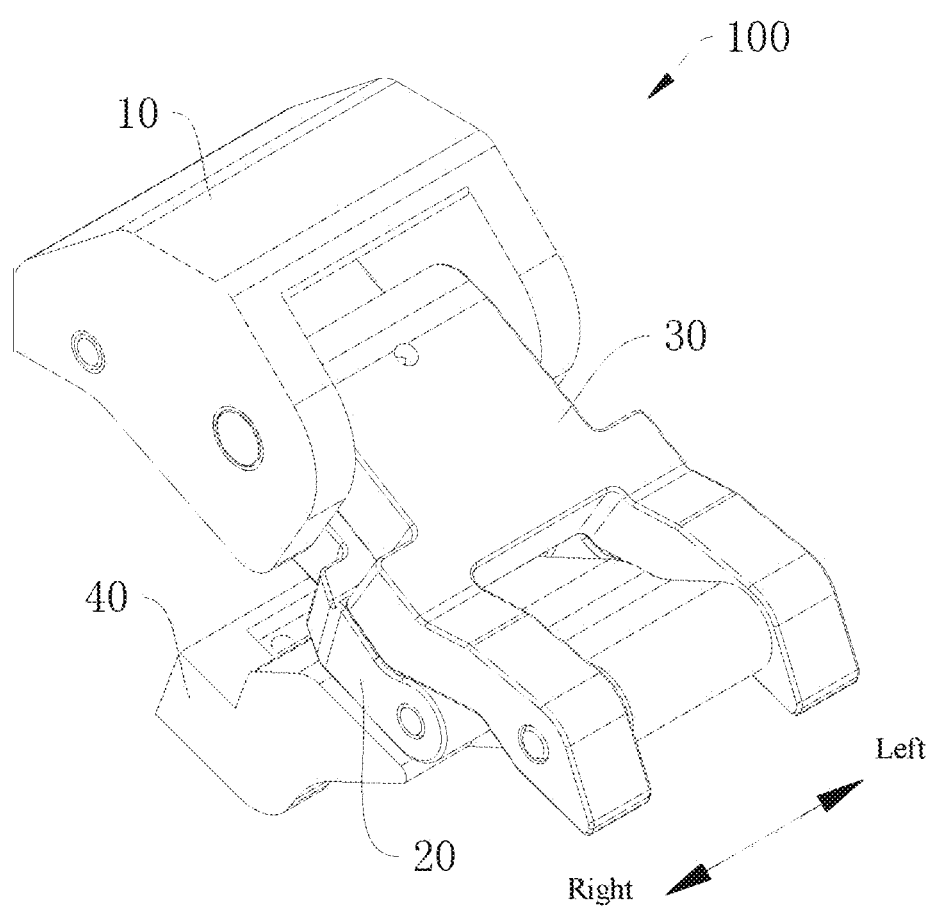
FIG. 9 is a schematic view of a drive assembly with a running board holder in a retracted position according to an embodiment of the present disclosure.
Figure 10:
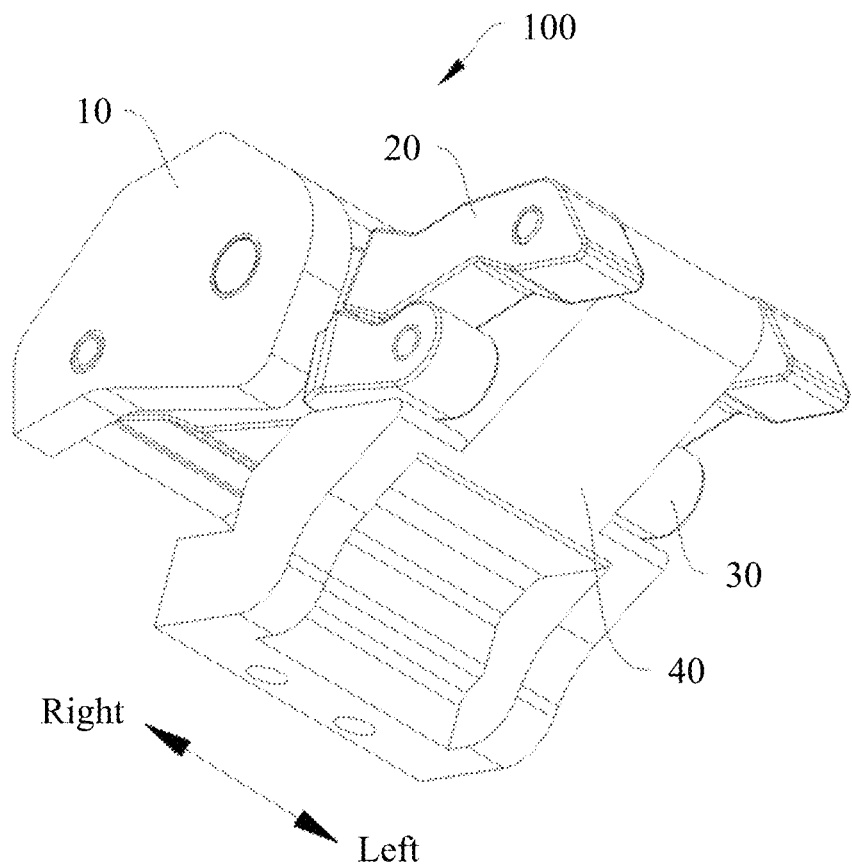
FIG. 10 is a schematic view of a drive assembly with a running board holder in a retracted position according to an embodiment of the present disclosure.
Figure 11:
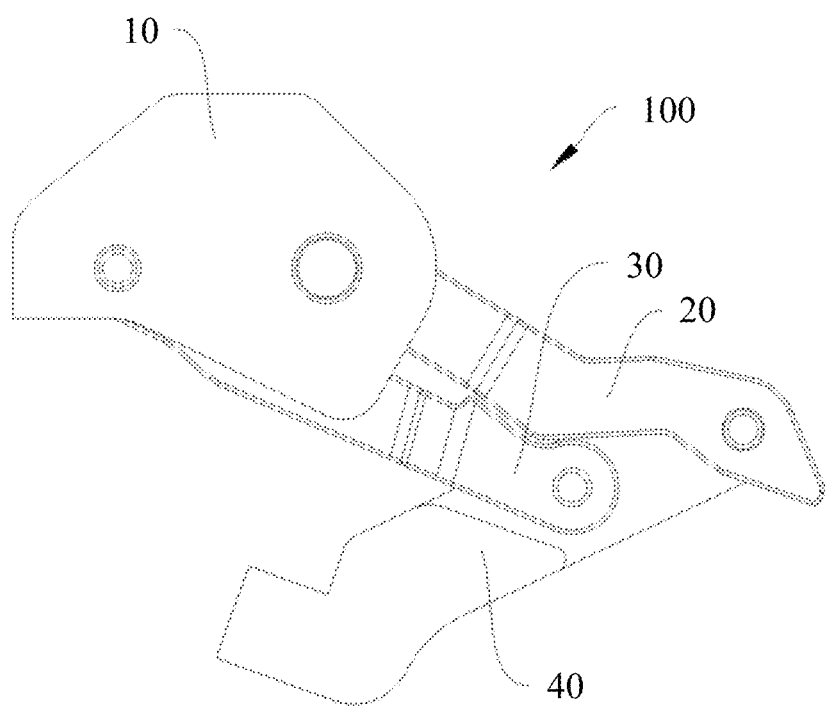
FIG. 11 is a side view of a drive assembly with a running board holder in a retracted position according to an embodiment of the present disclosure.
Figure 12:
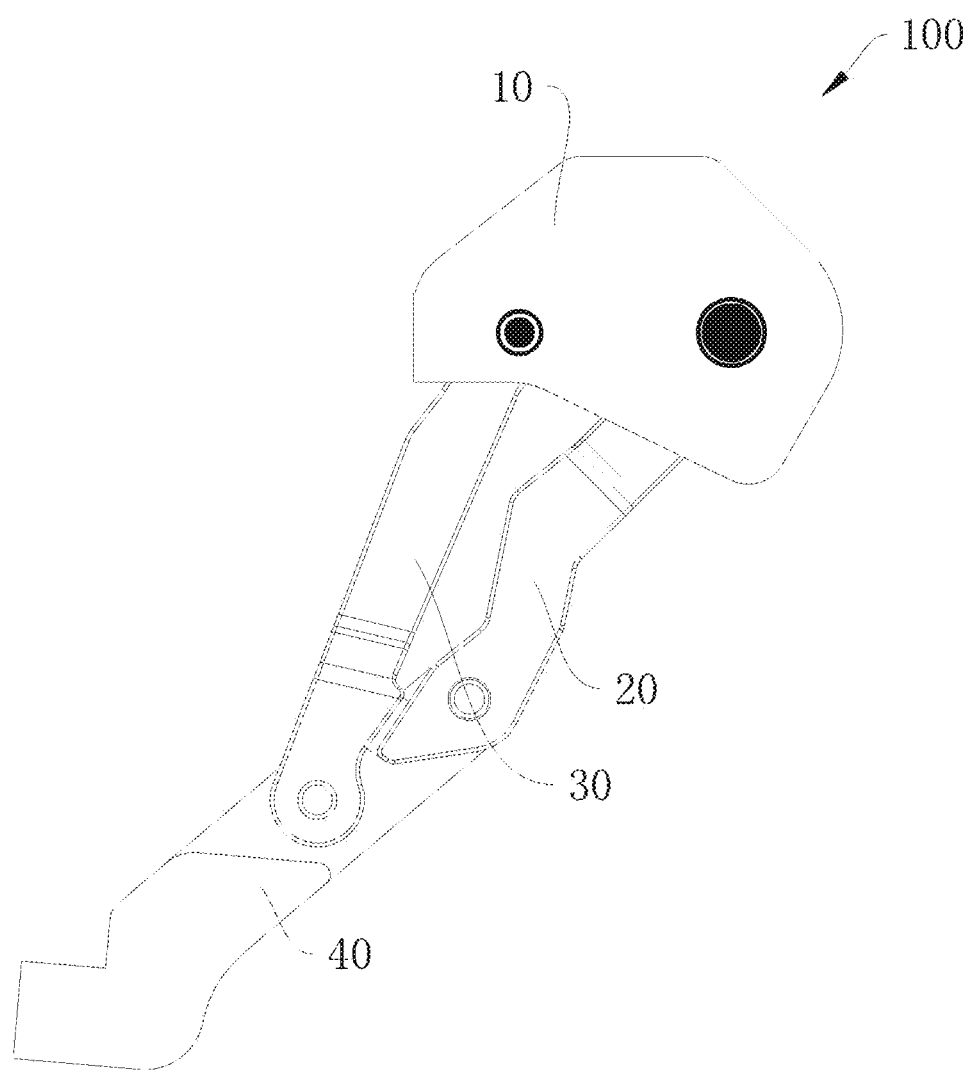
FIG. 12 is a side view of a drive assembly with a running board holder in an extended position according to an embodiment of the present disclosure.
Figure 13:
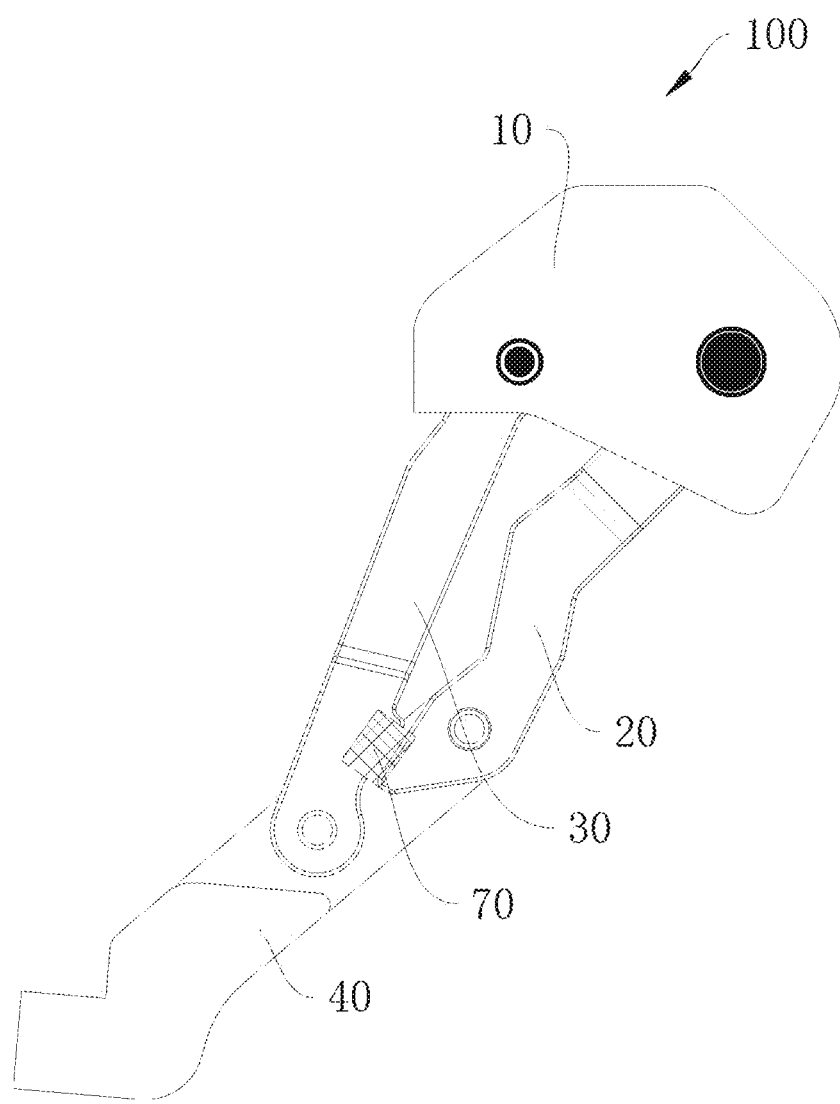
FIG. 13 is a side view of a drive assembly with a running board holder in an extended position according to an embodiment of the present disclosure.
Figure 14:
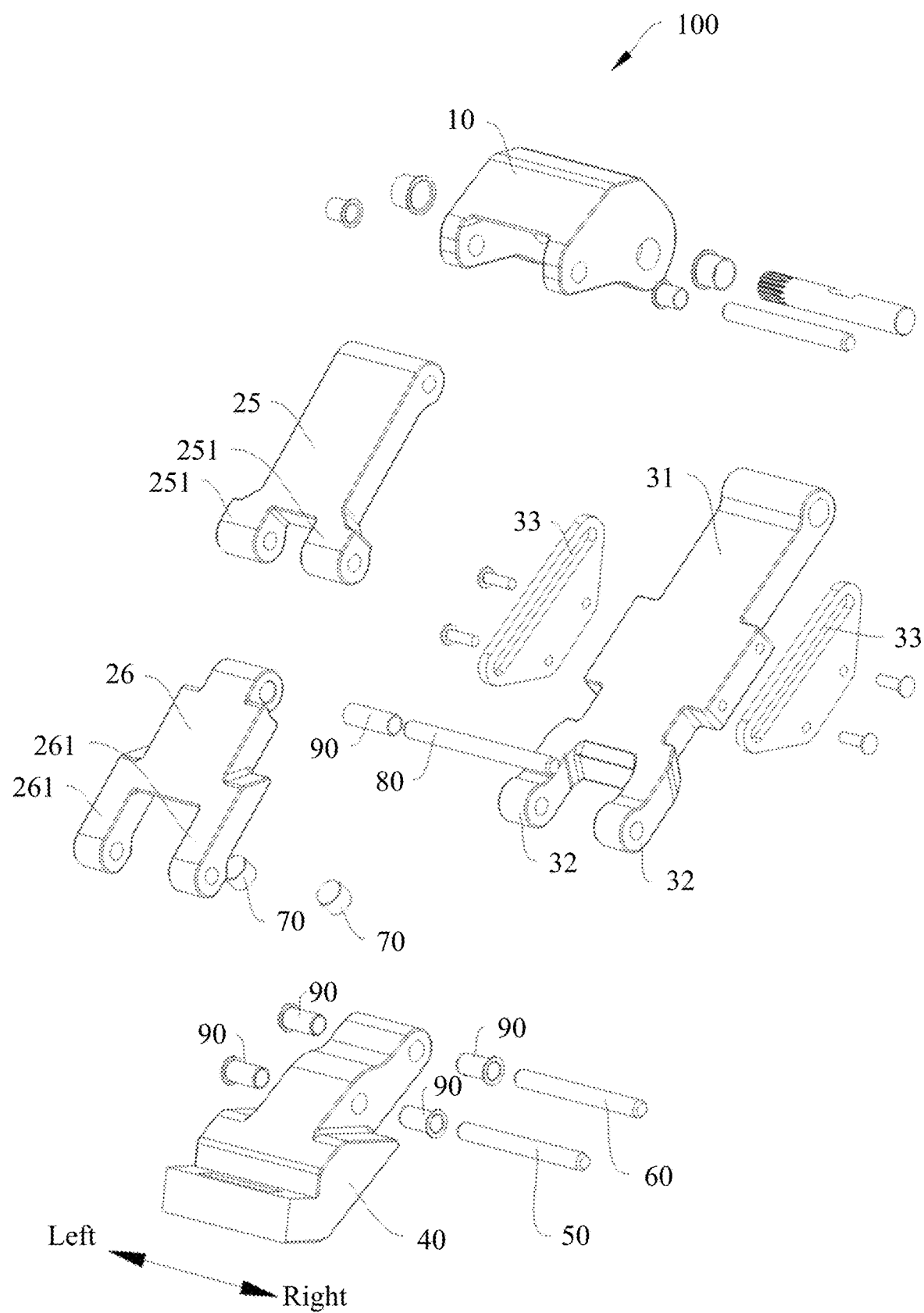
FIG. 14 is an exploded view of a drive assembly according to an embodiment of the present disclosure.
Figure 15:
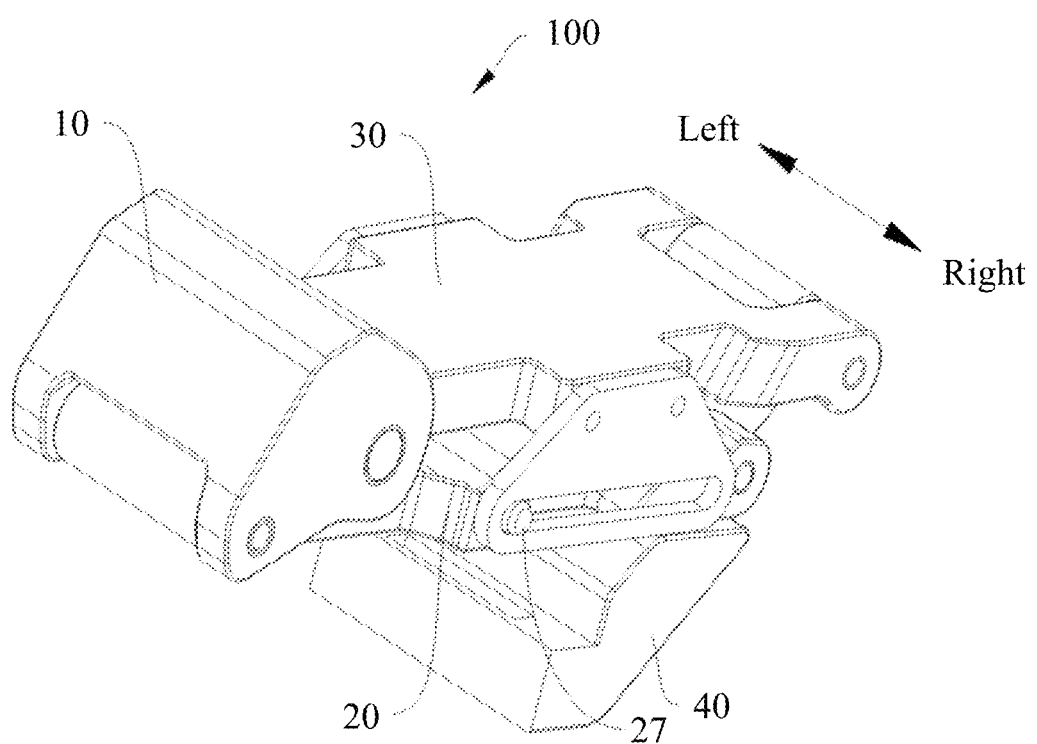
FIG. 15 is a schematic view of a drive assembly with a running board holder in a retracted position according to an embodiment of the present disclosure.
Figure 16:
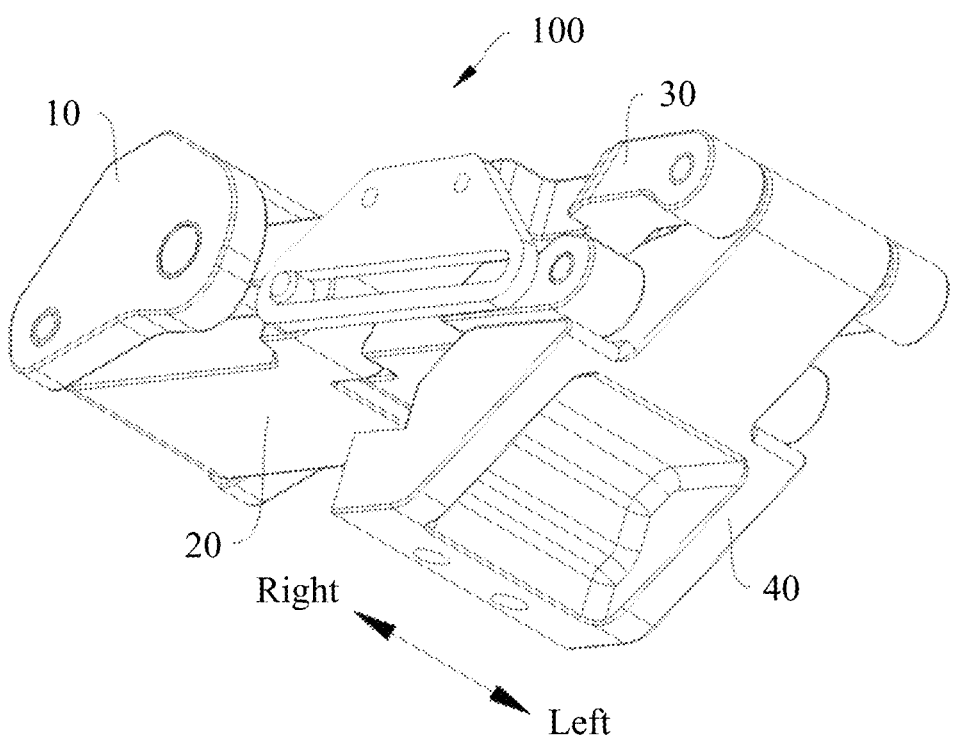
FIG. 16 is a schematic view of a drive assembly with a running board holder in a retracted position according to an embodiment of the present disclosure.
Figure 17:
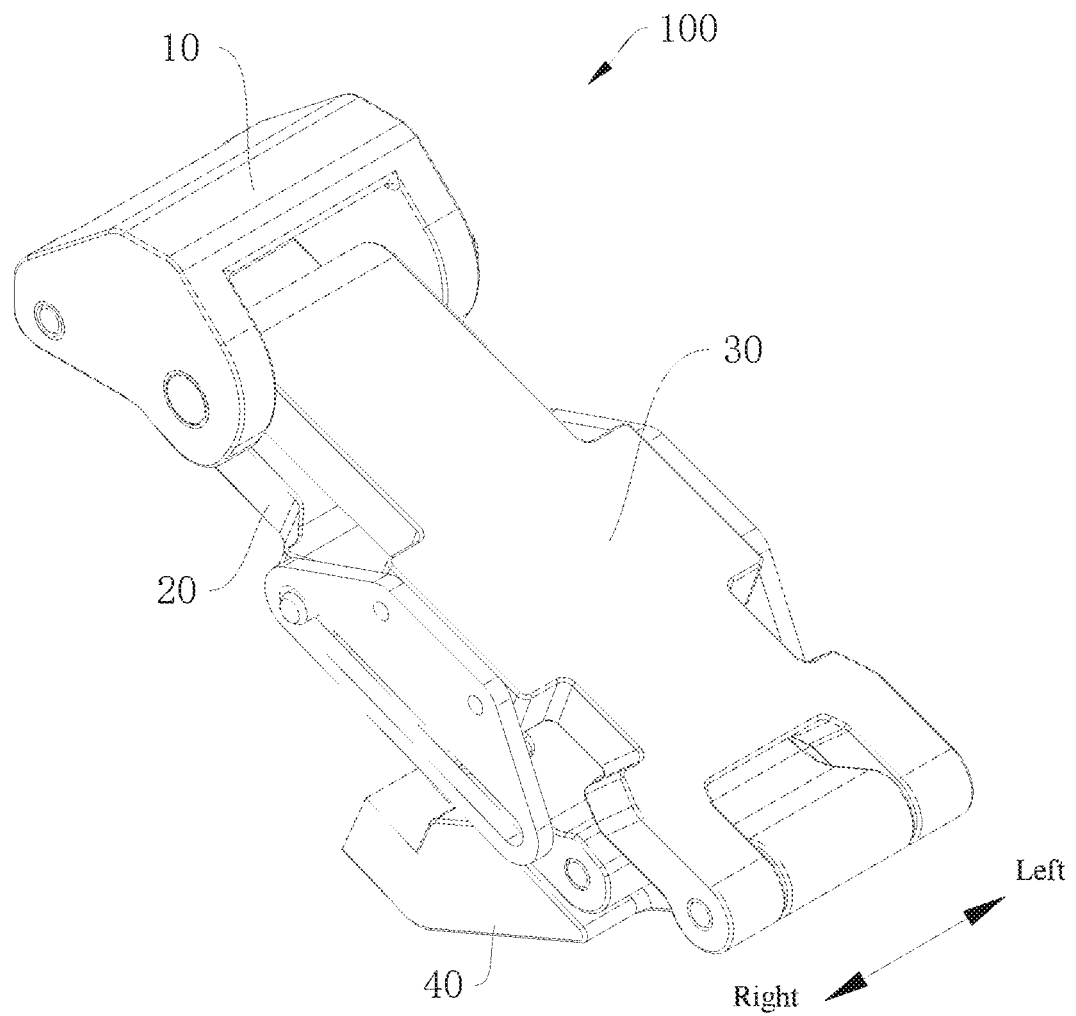
FIG. 17 is a schematic view of a drive assembly with a running board holder in a retracted position according to an embodiment of the present disclosure.
Figure 18:
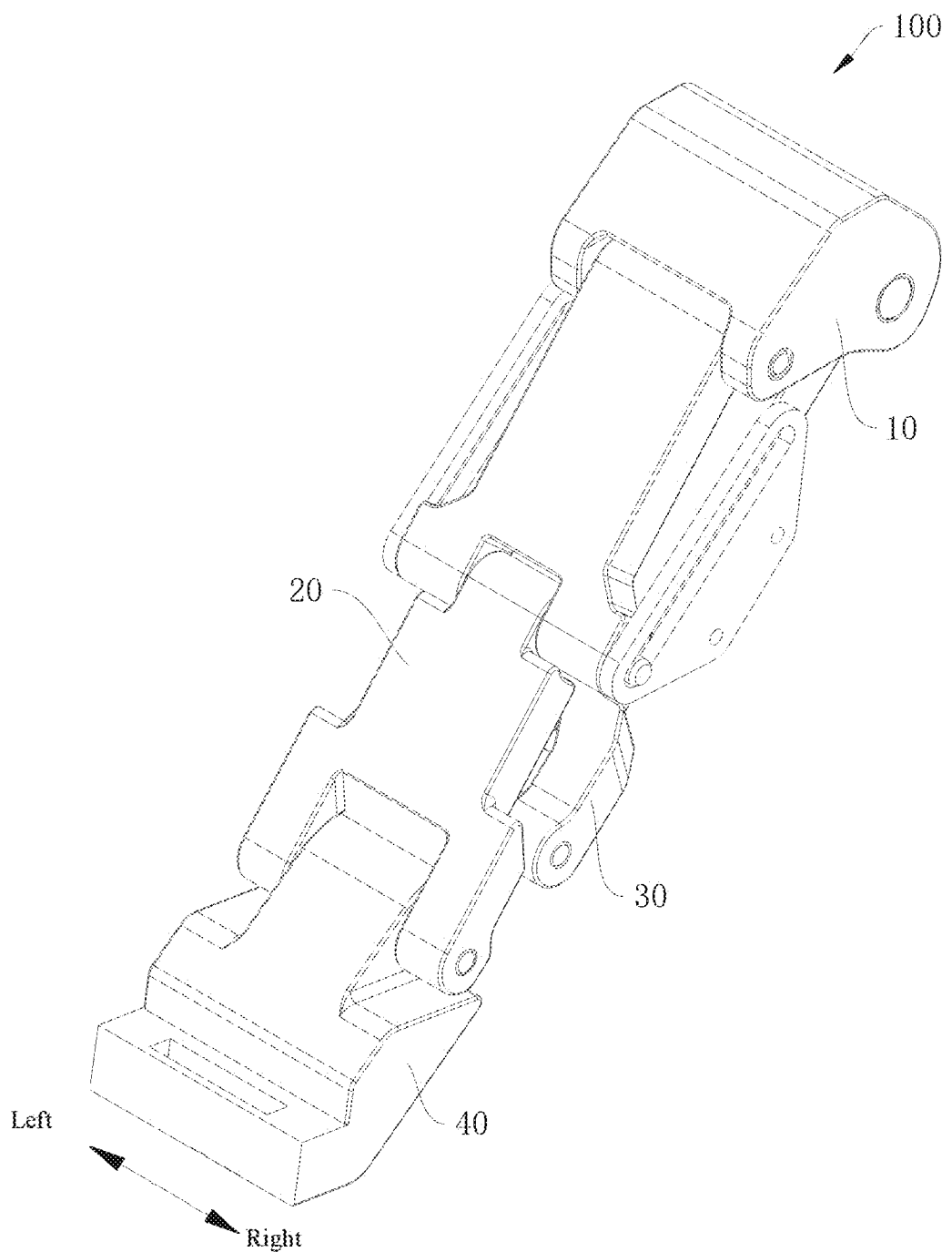
FIG. 18 is a schematic view of a drive assembly with a running board holder in an extended position according to an embodiment of the present disclosure.
Figure 19:
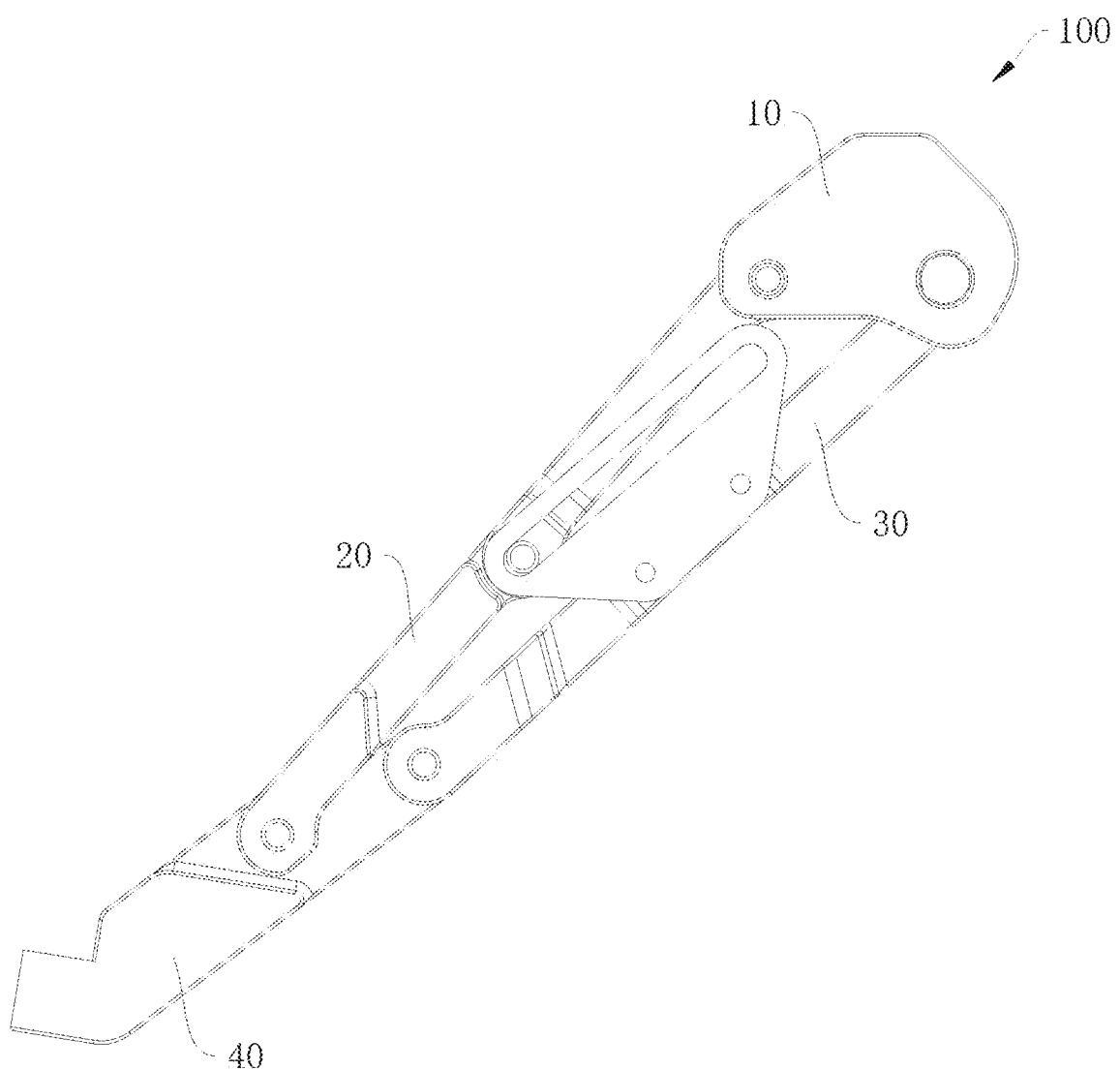
FIG. 19 is a side view of a drive assembly with a running board holder in an extended position according to an embodiment of the present disclosure.
Figure 20:
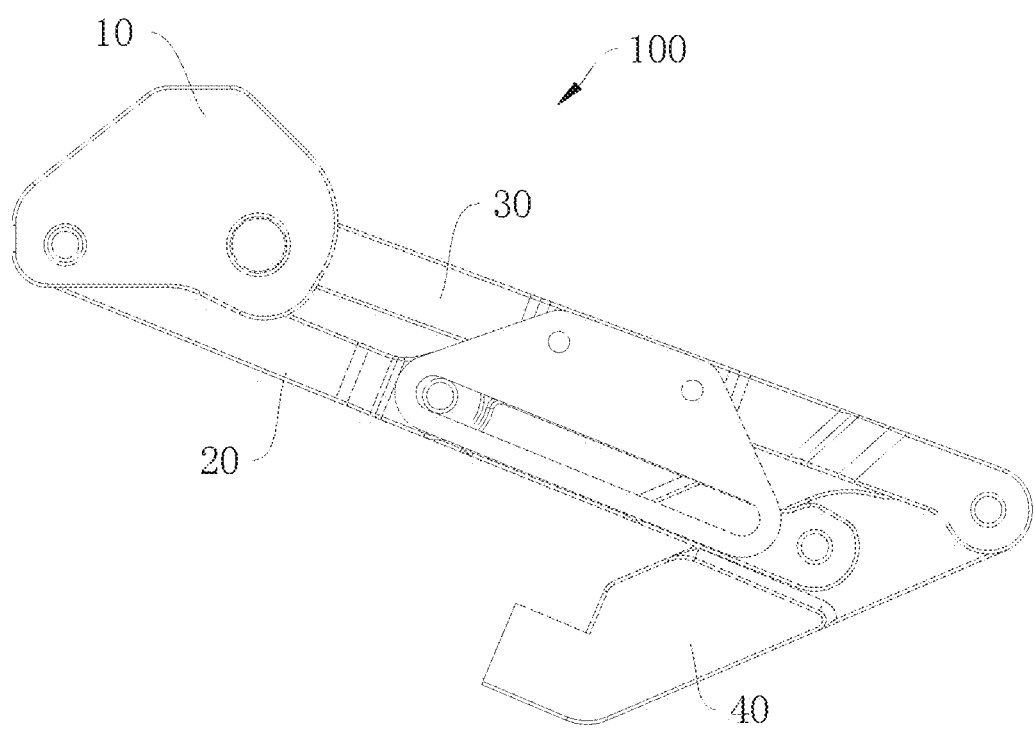
FIG. 20 is a side view of a drive assembly with a running board holder in a retracted position according to an embodiment of the present disclosure.
Figure 21:
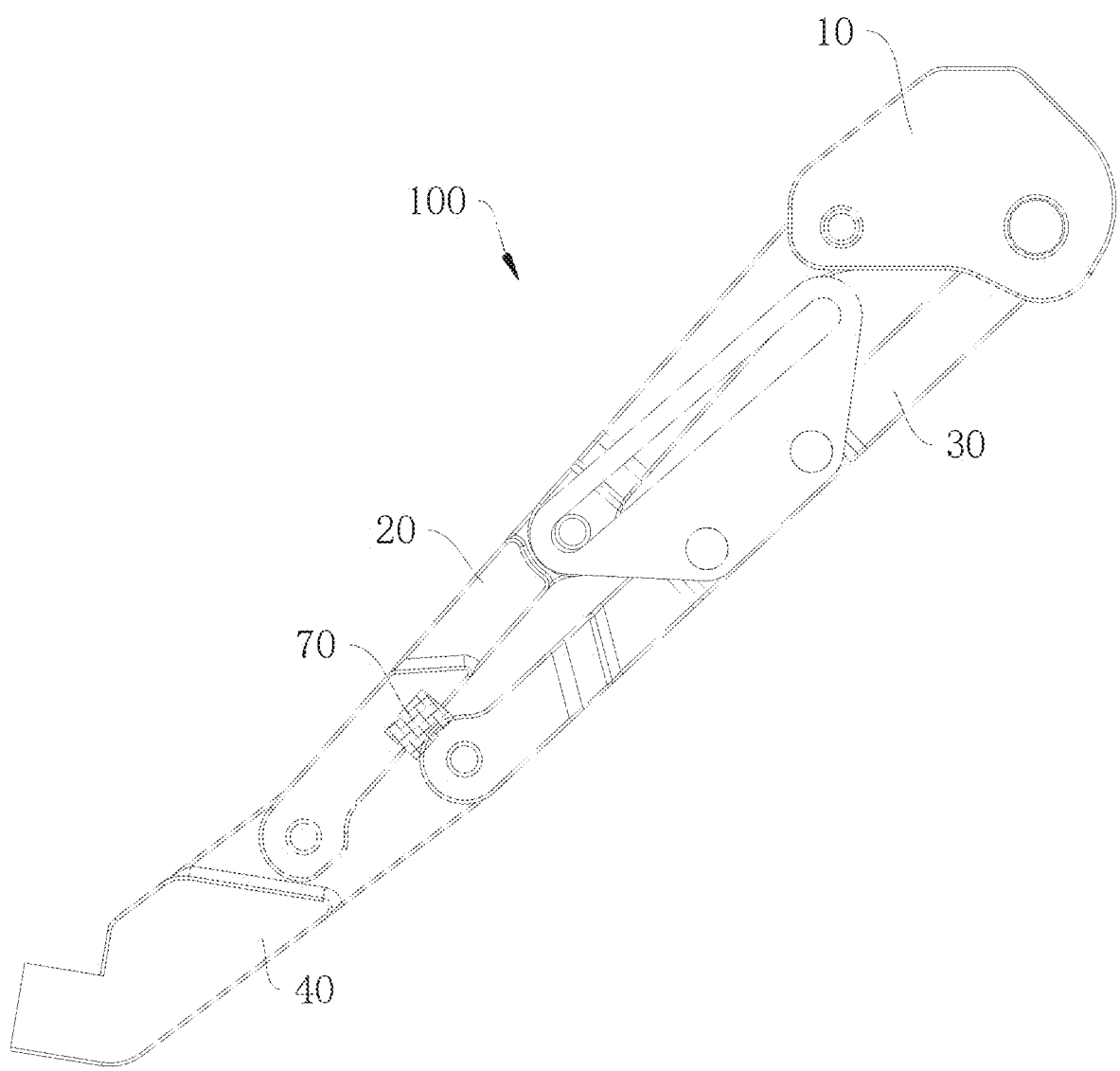
FIG. 21 is a side view of a drive assembly with a running board holder in an extended position according to an embodiment of the present disclosure.

As illustrated in FIGS. 1, 7 and 14, the drive assembly 100 for the running board 200 can generally include a mounting base 10, a first connecting portion 20, a second connecting portion 30, and a running board holder 40.

Specifically, the first connecting portion 20 is rotatably connected with the mounting base 10 and the running board holder 40, and the second connecting portion 30 is rotatably connected with the mounting base 10 and the running board holder 40. A central rotation shaft of the second connection portion 30 relative to the running board holder 40, a central rotation shaft of the second connection portion 30 relative to the mounting base 10, a central rotation shaft of the first connection portion 20 relative to the running board holder 40, and a central rotation shaft of the first connection portion 20 relative to the mounting base 10 each extend along a left-right direction and are parallel to one another. The mounting base 10, the first connecting portion 20, the second connecting portion 30 and the running board holder 40 constitute a linkage to make the running board holder 40 movable between an extended position and a retracted position.

That is, the first connecting portion 20 is rotatably connected with the mounting base 10 and the running board holder 40 through the respective central rotation shafts, and the second connecting portion 30 is rotatably connected with the mounting base 10 and the running board holder 40 through the respective central rotation shafts. In other words, the mounting base 10, the first connecting portion 20, the second connecting portion 30 and the running board holder 40 constitute the linkage. The mounting base 10 is mounted to a vehicle body and fixed. A driving part (not illustrated) is connected with at least one of the first connecting portion 20 and the second connecting portion 30, i.e. at least one of the first connecting portion 20 and the second connecting portion 30 is an active rod.

For example, the driving part can be connected with the first connecting portion 20, such that the first connecting portion 20 acts as the active rod, an end of the first connecting portion 20 rotates around the mounting base 10 while the other end thereof rotates around the running board holder 40 and drives the running board holder 40 to move, and the running board holder 40 drives an end of the second connecting portion 30 to rotate around the mounting base 10. The first connecting portion 20 can also be associated with the second connecting portion 30, and the first connecting portion 20 and the second connecting portion 30 together drive the running board holder 40 to extend or retract.

Certainly, the above embodiment is merely illustrative, and the driving part can also be connected with the second connecting portion 30, or the driving part can be connected with the first connecting portion 20 and the second connecting portion 30 simultaneously.

It should be understood that the running board holder 40 is mounted below a door of the vehicle, and when a passenger needs to get on or off, the running board holder 40 extends out of the vehicle body, i.e., the running board holder 40 is in the extended position, which is convenient for the passenger to get on and off the vehicle. When the vehicle is starting and traveling, the running board holder 40 is in the retracted position, that is, the running board holder 40 is retracted into the vehicle body, thus ensuring the safety of driving the vehicle.

As illustrated in FIGS. 1, 7 and 14, the running board holder 40 includes a third main body 41 and a third hinged portion 42 connected with the third main body 41; the first connecting portion 20 includes a first main body 21 and a plurality of first hinged portions 22 connected with the first main body 21 and spaced apart in the left-right direction, in which the third hinged portion 42 is rotatably connected among the plurality of first hinged portions 22. The second connecting portion 30 includes a second main body 31 and a plurality of second hinged portions 32 connected with the second main body 31 and spaced apart in the left-right direction, in which the third hinged portion 42 is rotatably connected among the plurality of second hinged portions 32.

In other words, the running board holder 40 has the third main body 41 and the third hinged portion 42; the first connecting portion 20 has the first main body 21 and the plurality of first hinged portions 22; and the second connecting portion 30 has the second main body 31 and the plurality of second hinged portions 32.

As illustrated in FIG. 1 in combination with FIGS. 2, 3, 4, 5 and 6, as illustrated in FIG. 7 in combination with FIGS. 8, 9, 10, 11, 12 and 13, as illustrated in FIG. 14 in combination with FIGS. 15, 16, 17, 18, 19, 20 and 21, the third hinged portion 42 is interposed among the plurality of first hinged portions 22 and the plurality of second hinged portions 32. For example, two first hinged portions 22 are provided and spaced apart in the left-right direction, and the third hinged portion 42 is sandwiched between the two first hinged portions 22 that are spaced apart from each other in the left-right direction. Alternatively, two second hinged portions 32 are provided and spaced apart in the left-right direction, and the third hinged portion 42 is sandwiched between the two second hinged portions 32 that are spaced apart from each other in the left-right direction. Alternatively, the third hinged portion 42 is simultaneously sandwiched between the first hinged portions 22 spaced apart along the left-right direction and between the second hinged portions 32 spaced apart along the left-right direction.

Certainly, the above embodiment is merely illustrative, and for example, three or more first hinged portions 22 and three or more second hinged portions 32 can be provided.

It could be understood that the third hinged portion 42 is wrapped by the first hinged portions 22 and the second hinged portions 32, in which case the first hinged portion 22 and the second hinged portion 32 have a relatively large width in the left-right direction and increased structural strength. In addition, the first hinged portion 22 and the second hinged portion 32 are tightly fitted with the third hinged portion 42, and a contact area of the third hinged portion 42 with the first hinged portion 22 and the second hinged portion 32 is enlarged, so that the reliability of the connection thereof is further improved.

Moreover, the third hinged portion 42 is wrapped by the first hinged portion 22 and the second hinged portion 32 to prevent the intrusion of mud, sand or the like, avoid the wear and abnormal noise of the hinged portions due to the mud and sand, and prolong the service life of the drive assembly 100.

Since the drive assembly 100 for the running board 200 according to the embodiments of the present disclosure forms the linkage, and the third hinged portion 42 is interposed among the plurality of first hinged portions 22 and the plurality of second hinged portions 32, the drive assembly 100 has a simple structure, high strength, low cost and long service life.

In some embodiments, as illustrated in FIG. 1 in combination with FIGS. 2, 3, 4, 5 and 6, as illustrated in FIG. 7 in combination with FIGS. 8, 9, 10, 11, 12 and 13, as illustrated in FIG. 14 in combination with FIGS. 15, 16, 17, 18, 19, 20 and 21, a first end of the first main body 21 is rotatably connected with the mounting base 10, while a second end of the first main body 21 is provided with two first hinged portions 22 spaced apart along the left-right direction; the two first hinged portions 22 are disposed at two sides of the third hinged portion 42, and the third hinged portion 42 is connected with the two first hinged portions 22 by a first connecting shaft 50. That is, two ends of the first connecting portion 20 are rotatably connected with the mounting base 10 and the running board holder 40 respectively. The first end of the first main body 21 is connected with the mounting base 10, and the two first hinged portions 22 are spaced apart and provided at the second end of the first main body 21; the first hinged portions 22 and the third hinged portion 42 are rotatably connected through the first connecting shaft 50. Thus, the third hinged portion 42 is wrapped between the two first hinged portions 22 to prevent the intrusion of mud, sand or the like, avoid the wear and abnormal noise of the hinged portions due to the mud and sand, and prolong the service life of the drive assembly 100.

In some embodiments, as illustrated in FIG. 1 in combination with FIGS. 2, 3, 4, 5 and 6, as illustrated in FIG. 7 in combination with FIGS. 8, 9, 10, 11, 12 and 13, as illustrated in FIG. 14 in combination with FIGS. 15, 16, 17, 18, 19, 20 and 21, a first end of the second main body 31 is rotatably connected with the mounting base 10, while a second end of the second main body 31 is provided with two second hinged portions 32 spaced apart along the left-right direction; the two second hinged portions 32 are disposed at two sides of the third hinged portion 42, and the third hinged portion 42 is connected with the two second hinged portions 32 by a second connecting shaft 60. That is, two ends of the second connecting portion 30 are rotatably connected with the mounting base 10 and the running board holder 40 respectively. The first end of the second main body 31 is connected with the mounting base 10, and the two second hinged portions 32 are spaced apart and provided at the second end of the second main body 31; the second hinged portions 32 and the third hinged portion 42 are rotatably connected through the second connecting shaft 60. Thus, the third hinged portion 42 is wrapped between the two second hinged portions 32 to prevent the intrusion of mud, sand or the like, avoid the wear and abnormal noise of the hinged portions due to the mud and sand, and prolong the service life of the drive assembly 100.

In some optional embodiments, as illustrated in FIGS. 1, 7, 14 and 22, at least one of the first connecting portion 20 and the running board holder 40 is provided with a damping block 70, and the damping block 70 abuts between the first connecting portion 20 and the running board holder 40 when the running board holder 40 is in at least one of the extended position and the retracted position. The damping block 70 plays a cushioning role to prevent the first connecting portion 20 from directly colliding with the running board holder 40, and avoid vibration and damage of the first connecting portion 20 and the running board holder 40 due to collision, such that the drive assembly 100 operates stably and the service life of the drive assembly 100 is prolonged. The damping block 70 can be provided to the first connecting portion 20, or the damping block 70 can be provided to the running board holder 40, or the damping block 70 can be simultaneously provided to the first connecting portion 20 and the running board holder 40. Further, the damping block 70 can abut between the first connecting portion 20 and the running board holder 40 when the running board holder 40 is in the extended position; the damping block 70 can abut between the first connecting portion 20 and the running board holder 40 also when the running board holder 40 is in the retracted position; the damping block 70 can also abut between the first connecting portion 20 and the running board holder 40 when the running board holder 40 is in the extended position or the retracted position. Additionally, one, or two or more damping blocks 70 can be provided.

The damping block 70 functions as a cushion to prevent the second connecting portion 30 from directly colliding with the running board holder 40 and avoid vibration and damage of the second connecting portion 30 and the running board holder 40 due to collision, such that the drive assembly 100 operates stably and the service life of the drive assembly 100 is prolonged. The damping block 70 can be provided to the second connecting portion 30, or the damping block 70 can be provided to the running board holder 40, or the damping block 70 can be simultaneously provided to the second connecting portion 30 and the running board holder 40. Further, the damping block 70 can abut between the second connecting portion 30 and the running board holder 40 when the running board holder 40 is in the extended position; the damping block 70 can abut between the second connecting portion 30 and the running board holder 40 also when the running board holder 40 is in the retracted position; the damping block 70 can also abut between the second connecting portion 30 and the running board holder 40 when the running board holder 40 is in the extended position or the retracted position. Additionally, one, or two or more damping blocks 70 can be provided.

In some optional embodiments, as illustrated in FIGS. 1, 7, 13, 14, 21 and 22, at least a part of the plurality of first hinged portions 22 is provided with the damping block 70. That is, at least one of the plurality of first hinged portions 22 is provided with the damping block 70. For example, two first hinged portions 22 are provided at an end of the first main body 21 and spaced apart in the left-right direction, and the damping block 70 can be provided to one of the first hinged portions 22 or can be simultaneously provided to both of the first hinged portions 22.

Further, as illustrated in FIG. 1 in combination with FIGS. 2, 3, 4, 5 and 6, as illustrated in FIG. 7 in combination with FIGS. 8, 9, 10, 11, 12 and 13, as illustrated in FIG. 14 in combination with FIGS. 15, 16, 17, 18, 19, 20 and 21, the third main body 41 is provided with a wedged bevel 411 opposite the first hinged portion 22, and when the running board holder 40 is in the extended position, the damping block 70 abuts against the wedged bevel 411. It could be understood that the first connecting portion 20 rotates relative to the running board holder 40, and the contact between the damping block 70 and the wedged bevel 411 is facilitated by providing the third main body 41 with the wedged bevel 411 opposite the first hinged portion 22, such that the damping block 70 can have a larger contact area with the wedged bevel 411, thereby improving a damping effect. Preferably, when the running board holder 40 is in the extended position, the damping block 70 abuts against and is in vertical contact with the wedged bevel 411, such that the damping block 70 has good mechanical behavior and a prolonged service life.

Figure 22:
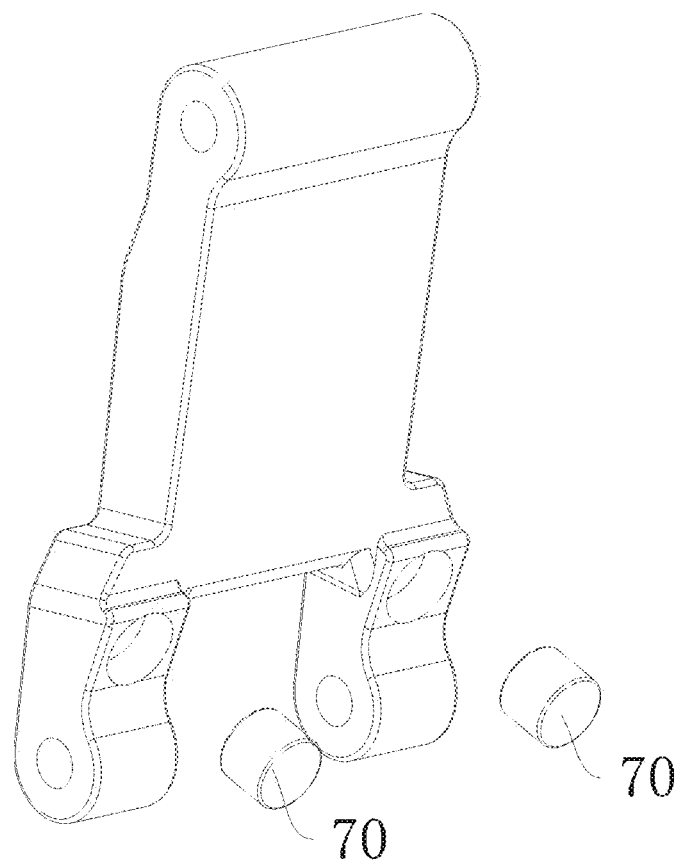
FIG. 22 is a schematic view of a connecting portion assembled with a damping block according to an embodiment of the present disclosure.

As illustrated in FIG. 22, a side of the first hinged portion 22 or the second hinged portion 32 facing the wedged bevel 411 has a groove, and the damping block 70 is accommodated in the groove. The groove functions to position the damping block 70 and enable the damping block 70 to be stably mounted to the first hinged portion 22 or the second hinged portion 32.

In some specific embodiments, as illustrated in FIG. 1 in combination with FIGS. 2, 3, 4, 5 and 6, as illustrated in FIG. 7 in combination with FIGS. 8, 9, 10, 11, 12 and 13, as illustrated in FIG. 14 in combination with FIGS. 15, 16, 17, 18, 19, 20 and 21, two first hinged portions 22 are provided and spaced apart in the left-right direction, and each of the first hinged portions 22 is provided with the damping block 70; the third main body 41 is provided with the wedged bevel 411 at each of left and right sides of the third hinged portion 42, and the two wedged bevels 411 are provided in one-to-one correspondence with the two first hinged portions 22; and when the running board holder 40 is in the extended position, the damping blocks 70 on the two first hinged portions 22 abut against the corresponding wedged bevels 411. As a result, when the running board holder 40 is in the extended position, the damping blocks 70 at the left and right sides abut against the corresponding wedged bevels 411 respectively, which leads to good balance and enhances a cushioning effect.

In some embodiments of the present disclosure, as illustrated in FIG. 7 in combination with FIGS. 8, 9, 10, 11, 12 and 13, the first connecting portion 20 is configured as a first link rod 23 with two ends connected with the mounting base 10 and the running board holder 40 respectively. The second connecting portion 30 is configured as a second link rod 34 with two ends connected with the mounting base 10 and the running board holder 40 respectively. That is, the drive assembly 100 is a four-bar linkage, and the drive assembly 100 has a simple structure and low cost.

In some embodiments of the present disclosure, as illustrated in FIG. 1 in combination with FIGS. 2, 3, 4, 5 and 6, as illustrated in FIG. 14 in combination with FIGS. 15, 16, 17, 18, 19, 20 and 21, the first connecting portion 20 includes a third link rod 25, a fourth link rod 26, and a support portion. The third link rod 25 is rotatably connected with the mounting base 10; two ends of the fourth link rod 26 are rotatably connected with the third link rod 25 and the running board holder 40 respectively; the support portion is connected at a hinge joint of the third link rod 25 and the fourth link rod 26; and the support portion is connected with the second connecting portion 30. As a result, the drive assembly 100 forms a five-bar linkage or a six-bar linkage. The driving part is connected with the third link rod 25, that is, the third link rod 25 is an active rod, and an end of the third link rod 25 is rotated around the mounting base 10 under the driving of the driving part, and the other end of the third link rod 25 drives the support portion and the fourth link rod 26 to move. The fourth link rod 26 drives the running board holder 40 to move while the support portion drives an end of the second connecting portion 30 to rotate around the mounting base 10, and the other end of the second connecting portion 30 drives the running board holder 40 to move. In other words, under the cooperation of the fourth link rod 26 and the second connecting portion 30, the running board holder 40 can be extended and retracted. It could be understood that the running board holder 40 is used to support the running board 200. When there is a passenger stepping on the running board 200, the running board holder 40 needs to have some load-bearing capacity, and the running board holder 40 needs to keep stable when bearing the load. With the linkage configured as the five-bar linkage or the six-bar linkage, the structure of the drive mechanism is stable on the one hand, and the load-bearing capacity of the drive mechanism is enhanced on the other hand.

In some embodiments of the present disclosure, as illustrated in FIG. 14 in combination with FIGS. 15, 16, 17, 18, 19, 20 and 21, the support portion is a sliding block 27, the second connecting portion 30 is provided with a sliding groove 33, and the support portion is slidably embedded in the sliding groove 33 along a direction perpendicular to the left-right direction. Thus, the drive assembly 100 forms a five-bar linkage. It could be understood that the sliding groove 33 has a guiding effect on the movement of the sliding block 27, such that the third link rod 25, the fourth link rod 26 and the second connecting portion 30 as well as the running board holder 40 all move along a predetermined trajectory, the movement of the first connecting portion 20 is associated with that of the second connecting portion 30, and under the cooperation of the fourth link rod 26 and the second connecting portion 30, the running board holder 40 can be extended and retracted.

In some other specific embodiments, as illustrated in FIG. 1 in combination with FIGS. 2, 3, 4, 5 and 6, the support portion is a fifth link rod 28, and an end of the fifth link rod 28 is rotatably connected at the hinge joint of the third link rod 25 and the fourth link rod 26 while the other end of the fifth link rod 28 is rotatably connected with the second connecting portion 30. Thus, the drive assembly 100 forms a six-bar linkage. The driving part is connected with the third link rod 25, that is, the third link rod 25 is an active rod, and an end of the third link rod 25 is rotated around the mounting base 10 under the driving of the driving part, and the other end of the third link rod 25 drives the fifth link rod 28 and the fourth link rod 26 to move. The fourth link rod 26 drives the running board holder 40 to move while the fifth link rod 28 drives an end of the second connecting portion 30 to rotate around the mounting base 10, and the other end of the second connecting portion 30 drives the running board holder 40 to move. As a result, the third link rod 25, the fourth link rod 26, the fifth link rod 28 and the second connecting portion 30 as well as the running board holder 40 all move along a predetermined trajectory, the movement of the first connecting portion 20 is associated with that of the second connecting portion 30, and under the cooperation of the fourth link rod 26 and the second connecting portion 30, the running board holder 40 can be extended and retracted.

In some optional embodiments, as illustrated in FIG. 1 in combination with FIGS. 2, 3, 4, 5 and 6, as illustrated in FIG. 14 in combination with FIGS. 15, 16, 17, 18, 19, 20 and 21, the third link rod 25 includes two fourth hinged portions 251 spaced apart in the left-right direction; the fourth link rod 26 includes a fifth hinged portion 261; the two fourth hinged portions 251 are disposed at left and right sides of the fifth hinged portion 261; and the fifth hinged portion 261 and the two fourth hinged portions 251 are connected by a third connecting shaft 80.

In other words, the fourth link rod 26 has the fifth hinged portion 261, and the third link rod 25 has the two fourth hinged portions 251, in which the fifth hinged portion 261 is sandwiched between the two fourth hinged portions 251.

It could be understood that the fifth hinged portion 261 is wrapped by the fourth hinged portions 251, in which case the fourth hinged portion 251 has a relatively large width in the left-right direction, and the structural strength of the fourth hinged portion 251 is enhanced. In addition, the fifth hinged portion 261 and the fourth hinged portion 251 are tightly fitted, and a contact area of the fifth hinged portion 261 with the fourth hinged portion 251 is enlarged, so that the reliability of the connection thereof is further improved.

Moreover, the fifth hinged portion 261 is wrapped by the two fourth hinged portions 251 to prevent the intrusion of mud, sand or the like, avoid the wear and abnormal noise of the hinged portions due to the mud and sand, and prolong the service life of the drive assembly 100.

In some embodiments, two ends of the third connecting shaft 80 protrude from the two fourth hinged portions 251 to form or connect the support portion. The third connecting shaft 80 protrude from both ends of the fourth hinged portion 251 along the left-right direction, so that a part of the third connecting shaft 80 protruding from both ends of the fourth hinged portion 251 can serve as the sliding block 27. The sliding block 27 is fitted with the sliding groove 33 in the second connecting portion 30 and moves along the sliding groove 33, which simplifies the structure and facilitates the assembling. In addition, the part of the third connecting shaft 80 protruding from both ends of the fourth hinged portion 251 can also facilitate the connection of the fifth link rod 28.

Preferably, as illustrated in FIGS. 1, 7 and 14, a sleeve 90 is provided between the first connecting shaft 50 and the first hinged portion 22, and the sleeve 90 has an interference fit with the first connecting shaft 50 and the first hinged portion 22. A sleeve 90 is provided between the second connecting shaft 60 and the second hinged portion 32, and provided between the third connecting shaft 80 and the fourth hinged portion 251, and the sleeve 90 has an interference fit with the third connecting shaft 80 and the fourth hinged portion 251. The sleeve 90 functions to protect the connecting shafts and the hinged portions, and additionally, the interference fit can prevent mud and sand from entering from the outside through a gap among the sleeve, the hinged portions and the connecting shafts, reduce wear and tear, and prolong the service life of the drive assembly 100.

Figure 23:
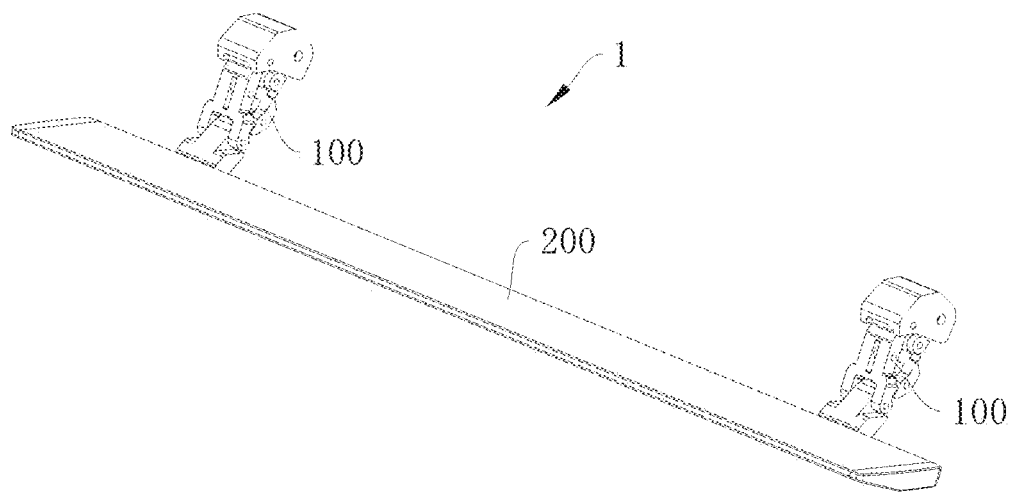
FIG. 23 is a schematic view of a running board assembly according to an embodiment of the present disclosure.

As illustrated in FIG. 23, a running board assembly 1 for a vehicle according to embodiments of the present disclosure includes a running board 200, a drive assembly 100, and the driving part, in which the drive assembly 100 is the above-described drive assembly.

Specifically, the running board holder 40 is connected with the running board 200, and the driving part is connected with the first connecting portion 20 to drive the first connecting portion 20 to rotate with respect to the mounting base 10.

The running board 200 is used for passengers to step on, so that passengers can get on and off the vehicle conveniently. The driving part can be an electric motor that drives the first connecting portion 20 to rotate with respect to the mounting base 10, the first connecting portion 20 drives the running board holder 40 to move, and the running board holder 40 is connected with the running board 200, such that the running board 200 can be extended or retracted. The second connecting portion 30 is rotatably connected with the running board holder 40, the running board holder 40 drives the second connecting portion 30 to rotate, and the first connecting portion 20 and the second connecting portion 30 each can provide support for the running board holder 40. Hence, the stability of the running board assembly 1 is enhanced.

Therefore, the running board assembly 1 according to embodiments of the present disclosure has the driving part that drives the first connecting portion 20 to rotate, and the running board assembly 1 has a simple structure, high stability and low cost.

In some embodiments, the running board 200 extends along the left-right direction, and is provided with a plurality of drive assemblies 100 spaced apart along the left-right direction. It could be understood that the drive assembly 100 is used to provide support for the running board 200, and by providing the running board 200 with the plurality of drive assemblies 100, the running board 200 can keep balanced and be safer. For example, one drive assembly 100 is provided adjacent to each of left and right ends of the running board 200, such that two ends of the running board 200 are supported along with better stability.

Advantageously, each drive assembly 100 is individually driven by one drive part. It could be understood that during long-term driving, the vehicle often encounters bumpy roads, which may cause one side of the running board 200 to sag, thereby affecting the transmission of the running board assembly 1, and the running board 200 also becomes unstable due to the tilt, resulting in poor safety performance. Since the drive assemblies 100 are spaced apart on the running board 200 in the left-right direction, and each drive assembly 100 has the driving part, a long transmission path is not required (for example, when there is only one driving part, a transmission member is required to transmit motion to each of the drive assemblies 100), and both sides of the running board 200 are supported, such that the running board 200 is not easy to sag, and the stability of the running board assembly 1 becomes high.

A vehicle according to embodiments of the present disclosure includes the above-described running board assembly 1. The vehicle is convenient for the passenger to get on and off, and have good stability and low cost.

Other compositions and configurations of the vehicle according to embodiments of the present disclosure are easily understood and readily available to those skilled in the art, which will not be elaborated herein.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial," and "circumferential" should be construed to refer to the orientation as then described or as shown in the drawings under discussion. These relative terms are for convenience and simplicity of description, and do not indicate or imply that the present disclosure have a particular orientation and be constructed or operated in a particular orientation. Thus, these terms cannot be constructed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications or mutual interaction of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples described in the specification and features of the various embodiments or examples may be combined by those skilled in the art without mutual contradictions.

Although embodiments of the present disclosure have been shown and described, it would be appreciated by those skilled in the art that the above embodiments are only exemplary, and cannot be construed to limit the present disclosure, and changes, modifications, alternatives and variations can be made in the embodiments without departing from the scope of the present disclosure.

What is claimed is:

1. A drive assembly for a vehicle running board, comprising:
    a mounting base attachable to a vehicle;
    a running board holder configured to attach to a running board step at a first end of the running board holder and comprising a hinge linking portion disposed on a second end of the running board holder opposite the first end;
    a first connecting portion rotatably connected with the mounting base and with the running board holder, the first connecting portion comprising a first link rod, the first link rod having two hinge portions disposed at one end of the first link rod and spaced apart to rotatably couple to the hinge linking portion on opposing sides of the hinge linking portion to form a first hinge joint between the first connecting portion and the running board holder; and
    a second connecting portion rotatably connected with the mounting base and with the running board holder, the second connecting portion comprising a second link rod, the second link rod having two hinge portions disposed at one end of the second link rod and spaced apart to rotatably couple to the hinge linking portion on the opposing sides of the hinge linking portion to form a second hinge joint between the second connecting portion and the running board holder,
    wherein the mounting base, the first connecting portion, the second connecting portion and the running board holder constitute a linkage to make the running board holder movable between an extended position and a retracted position,
    wherein the first connecting portion comprises a third link rod rotatably coupled to the first link rod and to the mounting base,
    wherein the first connecting portion comprises a support portion that is connected at a third hinge joint between the third link rod and the first link rod, wherein the support portion is in a fixed connection with the second connecting portion,
    wherein the support portion includes a sliding block and a sliding plate with an opening to provide a sliding groove, wherein the sliding plate is in the fixed connection with the second connecting portion, and wherein the sliding block protrudes from the third hinge joint and is slidably embedded in the sliding groove.

2. The drive assembly of claim 1, wherein the second connecting portion comprises a fourth link rod rotatably coupled to the second link rod and to the mounting base.

3. The drive assembly of claim 2, wherein the second connecting portion comprises a second support portion that is connected at a fourth hinge joint between the fourth link rod and the second link rod, wherein the second support portion is in a fixed connection with the first connecting portion.

4. The drive assembly of claim 3, wherein the second support portion includes a second sliding block and a second sliding plate with an opening to provide a second sliding groove, wherein the second sliding plate is in the fixed connection with the first connecting portion, and wherein the second sliding block protrudes from the fourth hinge joint and is slidably embedded in the second sliding groove.

5. The drive assembly of claim 1, comprising a damping block disposed on the first connecting portion or the running board holder, wherein the damping block abuts between the first connecting portion and the running board holder when the running board holder is in at least one of the extended position and the retracted position.

6. The drive assembly of claim 5, wherein the running board holder comprises a main body that is wider in at least one dimension than the hinge linking portion disposed on the second end of the running board holder that provides a wedged bevel at an interface between the main body and the hinge linking portion, and wherein at least a part of the two hinge portions of the first link rod is provided with the damping block, such that, when the running board holder is in the extended position, the damping block abuts against the wedged bevel.

7. The drive assembly of claim 1, wherein the first connection portion includes a first rotation shaft that couples the two hinge portions of the first link rod to the hinge linking portion of the running board holder to form the first hinge joint between the first connecting portion and the running board holder, and wherein the second connection portion includes a second rotation shaft that couples the two hinge portions of the second link rod to the hinge linking portion of the running board holder to form the second hinge joint between the first connecting portion and the running board holder.

8. The drive assembly of claim 1, comprising a driving part connected with the first connecting portion or with the second connecting portion to drive the first connecting portion or the second connecting portion, respectively, to rotate with respect to the mounting base.

9. A running board assembly for a vehicle, comprising:
   a running board step;
   a drive assembly; and
   a second drive assembly attached to the running board step at a location spaced apart from where the drive assembly is attached to the running board step,
   the drive assembly comprising:
      a mounting base attachable to the vehicle;
      a running board holder attached to the running board step at a first end of the running board holder and comprising a hinge linking portion disposed on a second end of the running board holder opposite the first end;
      a first connecting portion rotatably connected with the mounting base and with the running board holder, the first connecting portion comprising a first link rod, the first link rod having two hinge portions disposed at one end of the first link rod and spaced apart to rotatably couple to the hinge linking portion on opposing sides of the hinge linking portion to form a first hinge joint between the first connecting portion and the running board holder; and
      a second connecting portion rotatably connected with the mounting base and with the running board holder, the second connecting portion comprising a second link rod, the second link rod having two hinge portions disposed at one end of the second link rod and spaced apart to rotatably couple to the hinge linking portion on the opposing sides of the hinge linking portion to form a second hinge joint between the second connecting portion and the running board holder,
   wherein the mounting base, the first connecting portion, the second connecting portion and the running board holder constitute a linkage to make the running board holder movable between an extended position and a retracted position,
   wherein the first connecting portion comprises a third link rod rotatably coupled to the first link rod and to the mounting base, and wherein the second connecting portion comprises a fourth link rod rotatably coupled to the second link rod and to the mounting base.

10. The running board assembly of claim 9, wherein each of the drive assembly and the second drive assembly is individually driven by one driving part.

11. The running board assembly of claim 9, wherein the first connecting portion comprises a support portion that is connected at a third hinge joint between the third link rod and the first link rod, wherein the support portion is in a fixed connection with the second connecting portion.

12. The running board assembly of claim 9, wherein the second connecting portion comprises a support portion that is connected at a fourth hinge joint between the fourth link rod and the second link rod, wherein the support portion is in a fixed connection with the first connecting portion.

13. The running board assembly of claim 9, wherein the drive assembly comprises a damping block disposed on the first connecting portion or the running board holder, wherein the damping block abuts between the first connecting portion and the running board holder when the running board holder is in at least one of the extended position and the retracted position.

14. The running board assembly of claim 9, wherein the running board holder comprises a main body that is wider in at least one dimension than the hinge linking portion disposed on the second end of the running board holder that provides a wedged bevel at an interface between the main body and the hinge linking portion, and wherein at least a part of the two hinge portions of the first link rod is provided with the damping block, such that, when the running board holder is in the extended position, the damping block abuts against the wedged bevel.

15. A drive assembly for a vehicle running board, comprising:
   a mounting base attachable to a vehicle;
   a running board holder configured to attach to a running board step at a first end of the running board holder and comprising a hinge linking portion disposed on a second end of the running board holder opposite the first end;
   a first connecting portion rotatably connected with the mounting base and with the running board holder, the first connecting portion comprising a first link rod, the first link rod having two hinge portions disposed at one end of the first link rod and spaced apart to rotatably couple to the hinge linking portion on opposing sides of the hinge linking portion to form a first hinge joint between the first connecting portion and the running board holder; and
   a second connecting portion rotatably connected with the mounting base and with the running board holder, the second connecting portion comprising a second link rod, the second link rod having two hinge portions disposed at one end of the second link rod and spaced apart to rotatably couple to the hinge linking portion on the opposing sides of the hinge linking portion to form a second hinge joint between the second connecting portion and the running board holder,
   wherein the mounting base, the first connecting portion, the second connecting portion and the running board holder constitute a linkage to make the running board holder movable between an extended position and a retracted position,
   wherein the first connecting portion comprises a third link rod rotatably coupled to the first link rod and to the mounting base, and wherein the second connecting portion comprises a fourth link rod rotatably coupled to the second link rod and to the mounting base.

16. The drive assembly of claim 15, comprising a damping block disposed on the first connecting portion or the running board holder, wherein the damping block abuts between the first connecting portion and the running board holder when the running board holder is in at least one of the extended position and the retracted position.

17. The drive assembly of claim 16, wherein the running board holder comprises a main body that is wider in at least one dimension than the hinge linking portion disposed on the second end of the running board holder that provides a wedged bevel at an interface between the main body and the hinge linking portion, and wherein at least a part of the two hinge portions of the first link rod is provided with the damping block, such that, when the running board holder is in the extended position, the damping block abuts against the wedged bevel.

18. The drive assembly of claim 15, wherein the first connection portion includes a first rotation shaft that couples the two hinge portions of the first link rod to the hinge linking portion of the running board holder to form the first hinge joint between the first connecting portion and the running board holder, and wherein the second connection portion includes a second rotation shaft that couples the two hinge portions of the second link rod to the hinge linking portion of the running board holder to form the second hinge joint between the first connecting portion and the running board holder.

19. The drive assembly of claim 15, comprising a driving part connected with the first connecting portion or with the second connecting portion to drive the first connecting portion or the second connecting portion, respectively, to rotate with respect to the mounting base.

* * * * *